US010523402B1

(12) United States Patent
Pabst

(10) Patent No.: US 10,523,402 B1
(45) Date of Patent: Dec. 31, 2019

(54) MULTI-MEDIA FULL DUPLEX PACKET DATA SPLITTER

(71) Applicant: William George Pabst, Sunnyvale, CA (US)

(72) Inventor: William George Pabst, Sunnyvale, CA (US)

( * ) Notice: Subject to any disclaimer, the term of this patent is extended or adjusted under 35 U.S.C. 154(b) by 0 days.

(21) Appl. No.: 13/835,730

(22) Filed: Mar. 15, 2013

Related U.S. Application Data

(63) Continuation-in-part of application No. 12/800,091, filed on May 7, 2010, now Pat. No. 8,446,848.

(51) Int. Cl.
*H04L 5/14* (2006.01)

(52) U.S. Cl.
CPC ..................... *H04L 5/14* (2013.01)

(58) Field of Classification Search
CPC ..... H04L 5/14; H04L 25/0272; H04L 5/1423; H04L 12/2838; H04B 3/54
USPC .................. 710/106, 105; 370/270, 295, 328
See application file for complete search history.

(56) References Cited

U.S. PATENT DOCUMENTS

| | | | | |
|---|---|---|---|---|
| 6,094,439 A * | 7/2000 | Krishna | ............... | H04L 29/06 370/445 |
| 6,122,704 A * | 9/2000 | Hass | .................. | G01K 1/028 374/E1.006 |
| 6,400,715 B1 * | 6/2002 | Beaudoin | ............ | H04L 49/25 370/392 |
| 7,308,023 B1 * | 12/2007 | Blair | .................... | G06F 1/22 370/270 |
| 2002/0061012 A1 * | 5/2002 | Thi | .................... | H04B 3/23 370/352 |
| 2002/0078249 A1 * | 6/2002 | Lu | .................. | H04L 12/2838 719/310 |
| 2003/0061341 A1 * | 3/2003 | Loh | .................... | H04L 69/08 709/224 |
| 2003/0179711 A1 * | 9/2003 | Huff | .................... | H04L 12/28 370/248 |
| 2003/0225951 A1 * | 12/2003 | Knapp | .............. | G06F 13/4286 710/105 |
| 2004/0001440 A1 * | 1/2004 | Kostoff, II | .............. | H04L 47/32 370/235 |
| 2004/0073716 A1 * | 4/2004 | Boom et al. | .................. | 709/250 |
| 2005/0078683 A1 * | 4/2005 | Page | .................... | G10H 1/0058 370/395.5 |
| 2005/0084076 A1 * | 4/2005 | Dhir | .................... | H04L 12/5692 379/55.1 |

(Continued)

*Primary Examiner* — Atique Ahmed
(74) *Attorney, Agent, or Firm* — Ronald C. Fish

(57) ABSTRACT

A Network Splitter, using three network connections. Splitting of the data paths occurs up stream from the networks connection, between the PHY, and the MAC, of the OSI model. Splitting is done by connecting the transmit data and transmit control of the layer representing the connection of the first network device, to the receive data and receive control of the layer representing the connection to the second network device, and connecting the transmit data and transmit control of the layer representing the connection to the third network device to the receive data and receive control signals of the layer representing the connection to the first network device. In this way, packet network data is being sent to a second network connection from the first network connection, and packet data is being transmitted from a third network connection to the first network connection.

6 Claims, 25 Drawing Sheets

(56) References Cited

U.S. PATENT DOCUMENTS

| | | | | |
|---|---|---|---|---|
| 2006/0182034 A1* | 8/2006 | Klinker et al. | | 370/238 |
| 2007/0147340 A1* | 6/2007 | Park, II | H04L 49/352 | 370/351 |
| 2007/0169179 A1* | 7/2007 | Narad | H04L 45/16 | 726/4 |
| 2007/0255855 A1* | 11/2007 | Knapp | H04J 3/0605 | 709/248 |
| 2008/0095083 A1* | 4/2008 | Sorenson et al. | | 370/295 |
| 2009/0077288 A1* | 3/2009 | Sobelman | | 710/106 |
| 2010/0211664 A1* | 8/2010 | Raza | H01R 13/6658 | 709/223 |
| 2011/0026411 A1* | 2/2011 | Hao | H04L 12/40189 | 370/249 |

\* cited by examiner

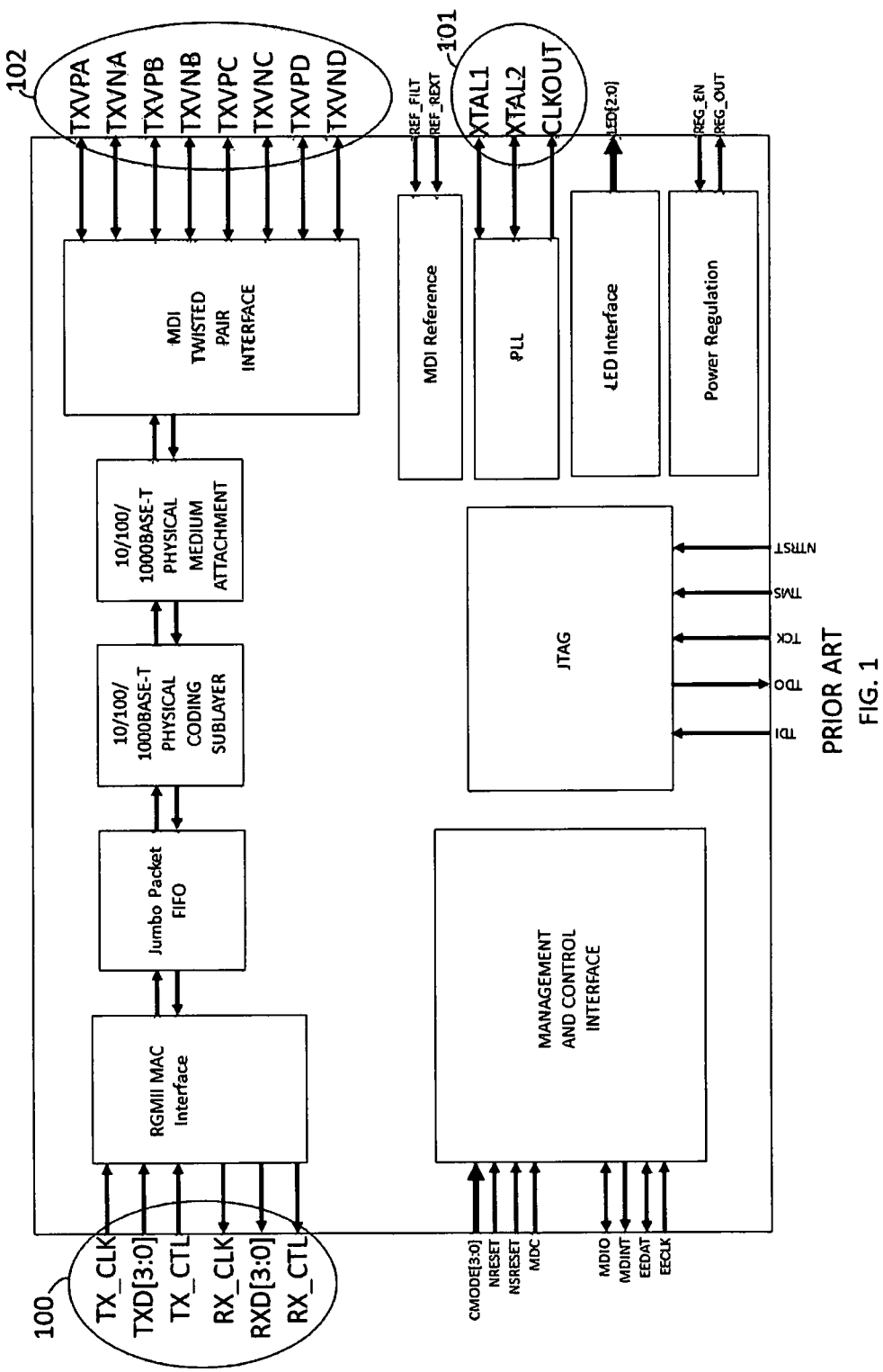
PRIOR ART
FIG. 1

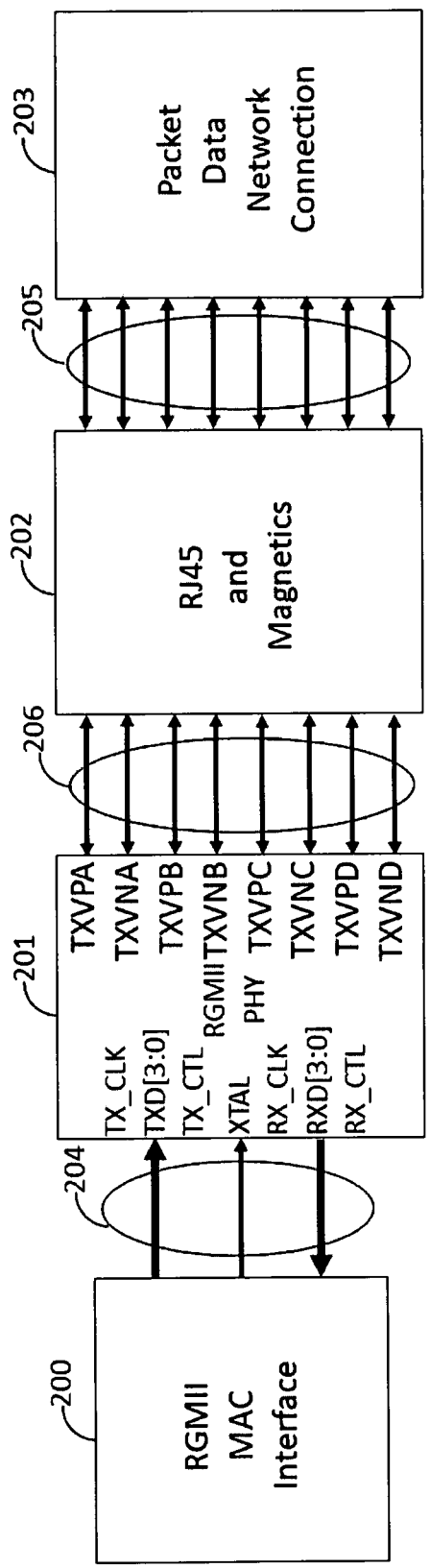
PRIOR ART
FIG. 2

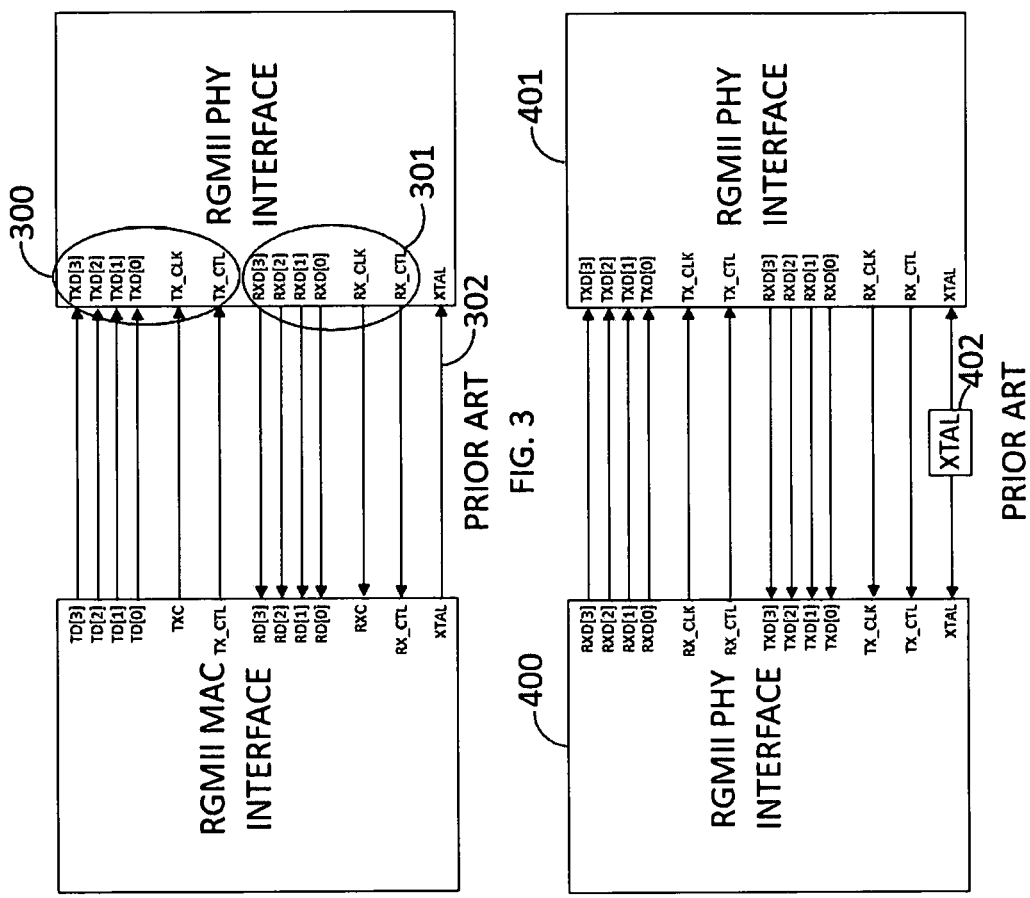
PRIOR ART
FIG. 3
PRIOR ART
FIG. 4

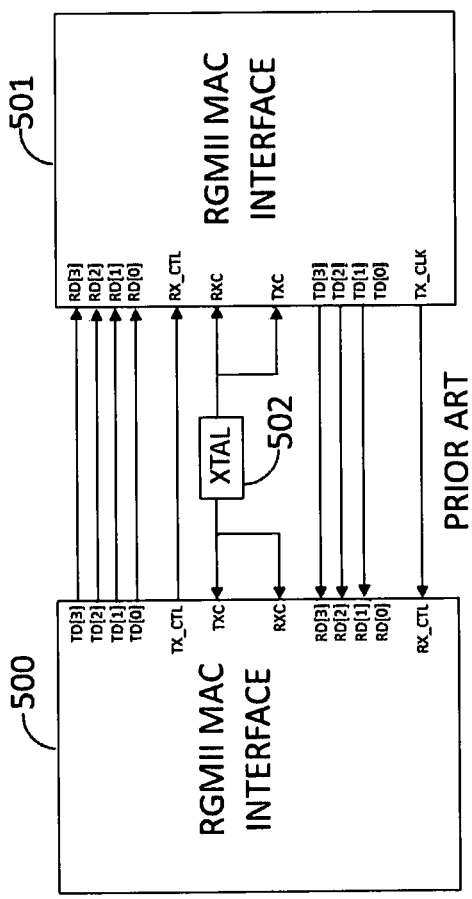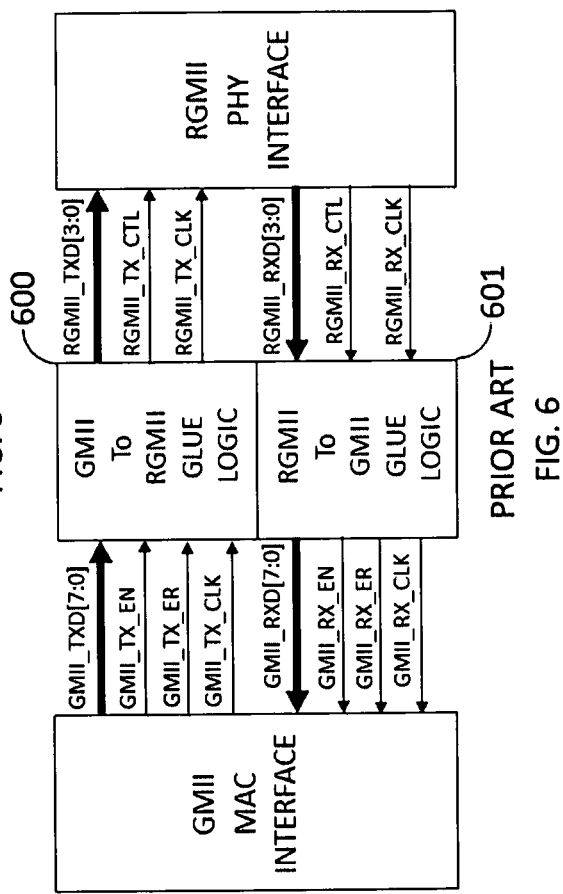
PRIOR ART
FIG. 5
PRIOR ART
FIG. 6

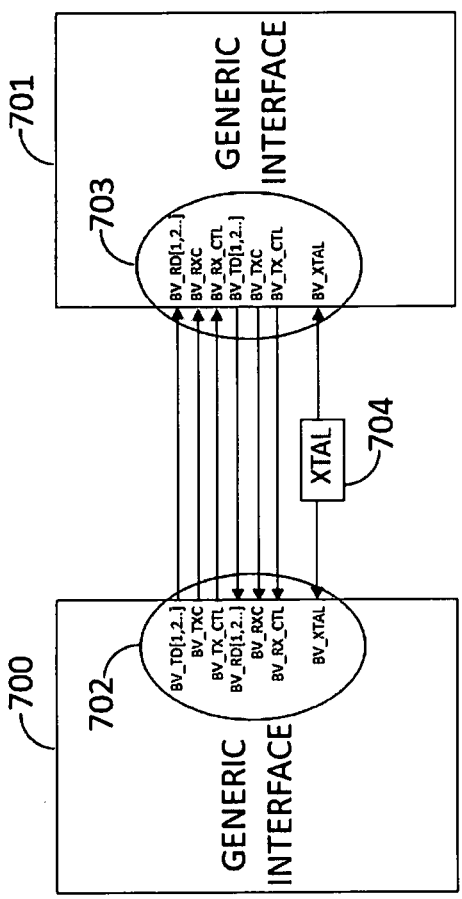
FIG. 7
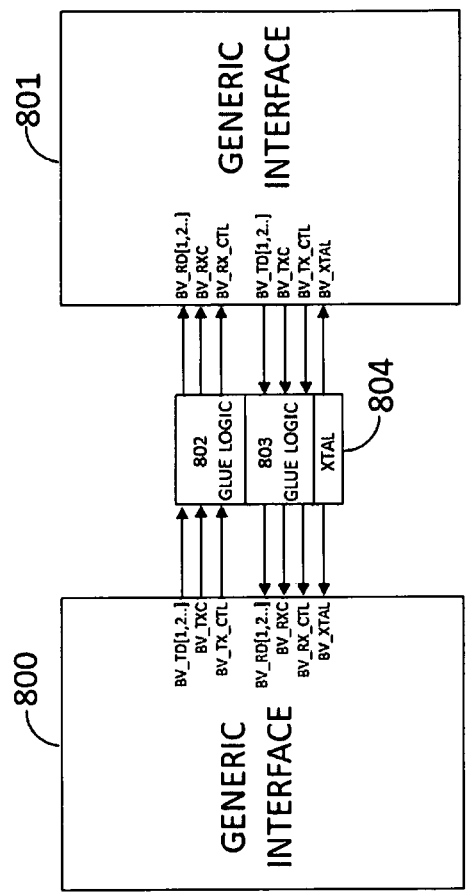
FIG. 8

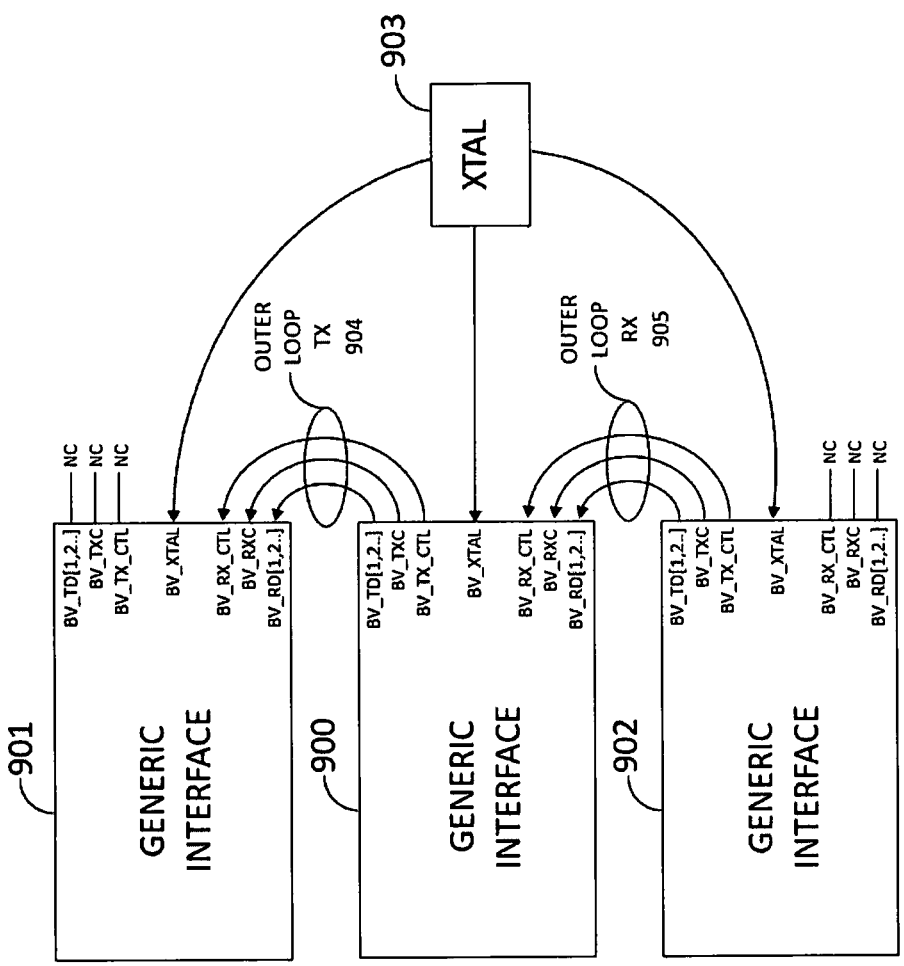
FIG. 9

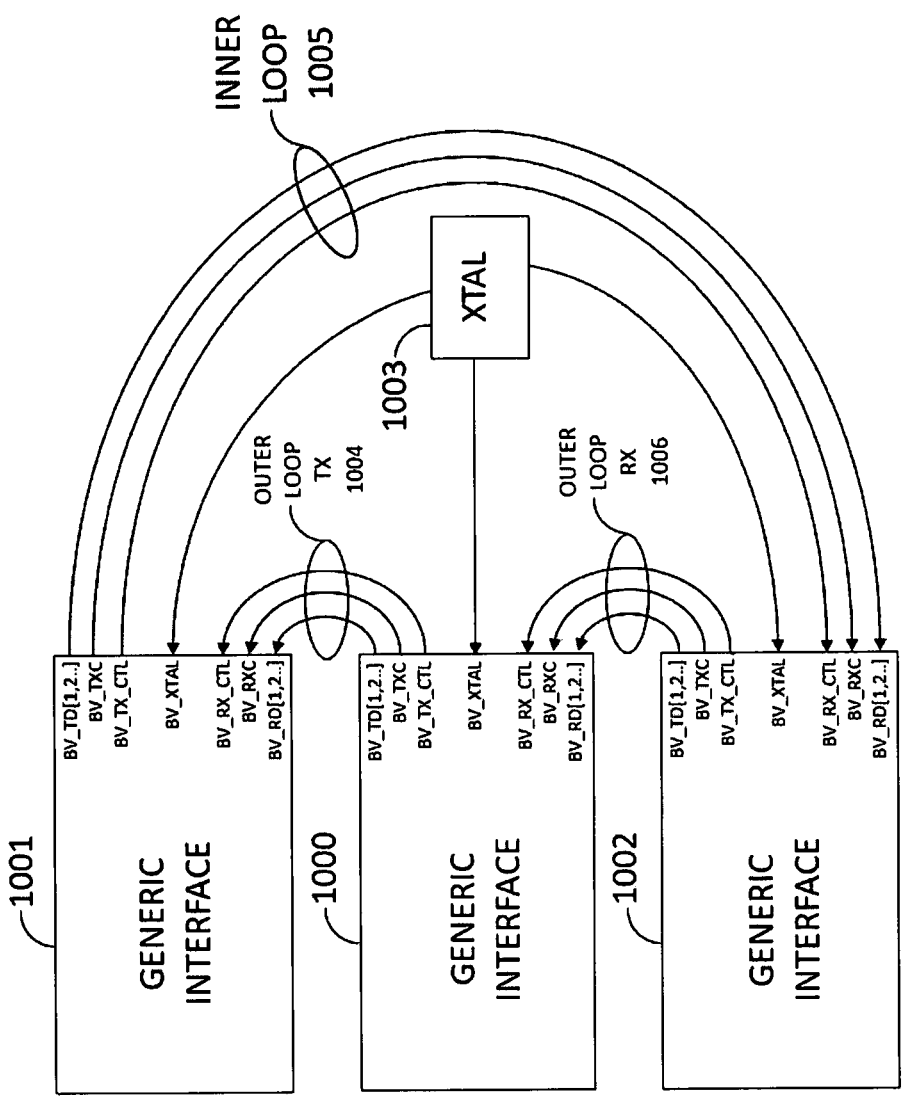
FIG. 10

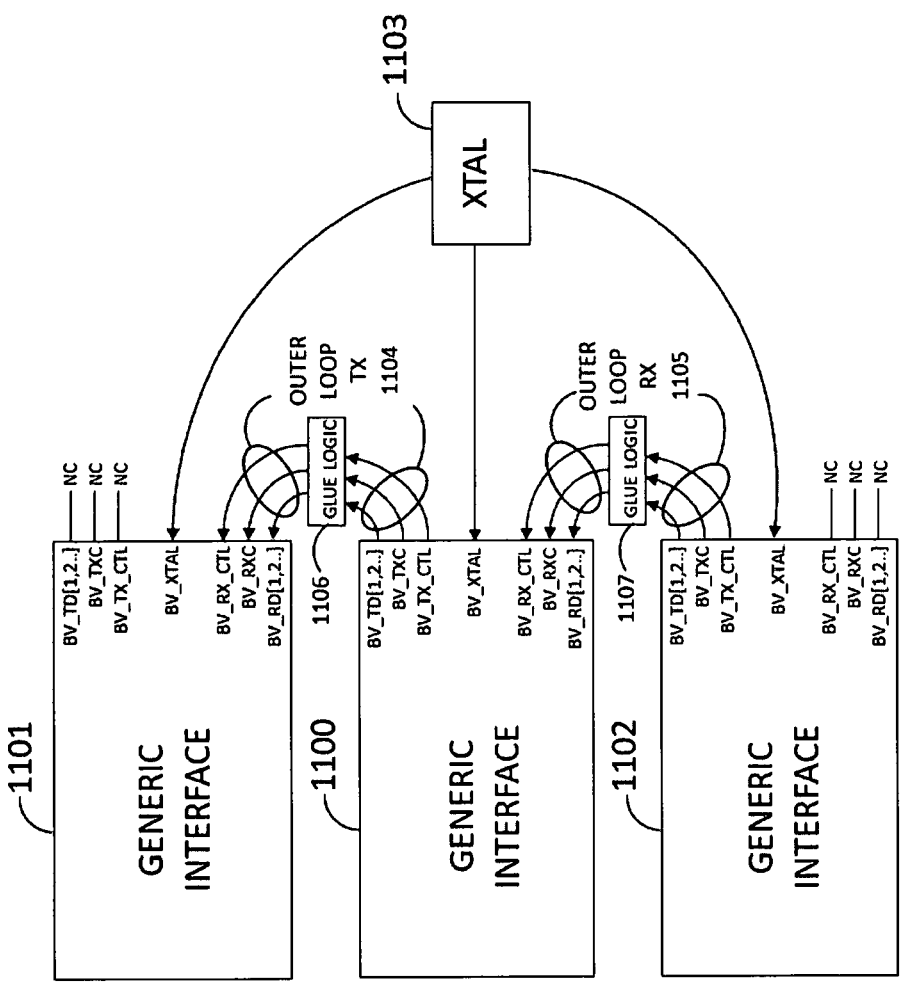
FIG. 11

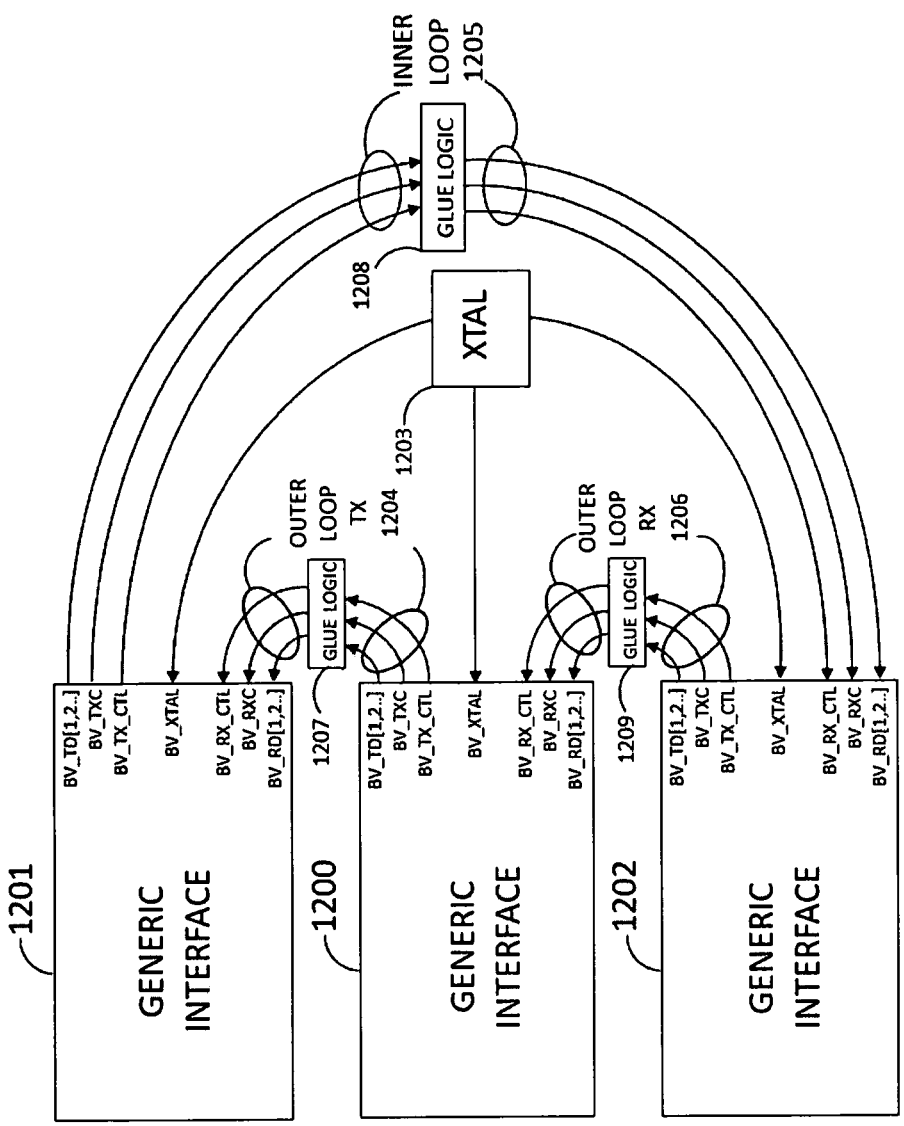
FIG. 12

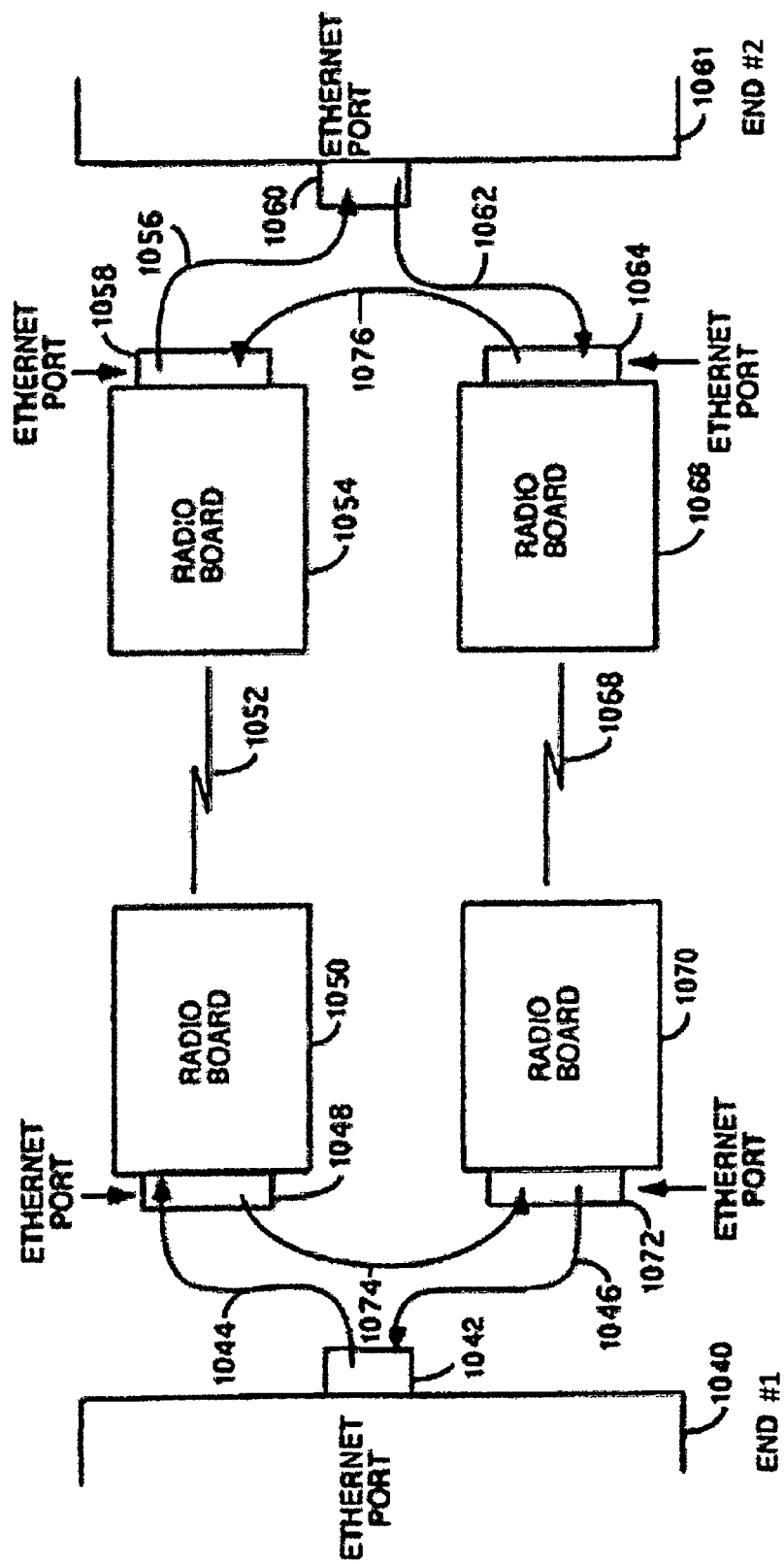
FIG. 13

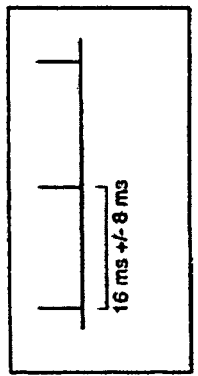
FIG. 14
A SEQUENCE OF NORMAL LINK PULSES, USED BY 10BASE-T DEVICES TO ESTABLISH LINK INTEGRITY
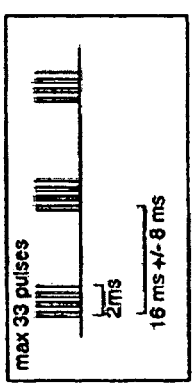
FIG. 15
THREE TRAINS OF FAST LINK PULSES, USED BY AUTONEGOTIATING DEVICES TO DECLARE THEIR CAPABILITIES
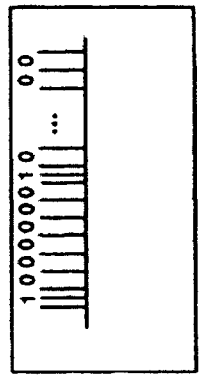
FIG. 16
HOW A LINK CODE WORD (A 16 BIT WORD) IS ENCODED IN A FAST LINK PULSE BURST

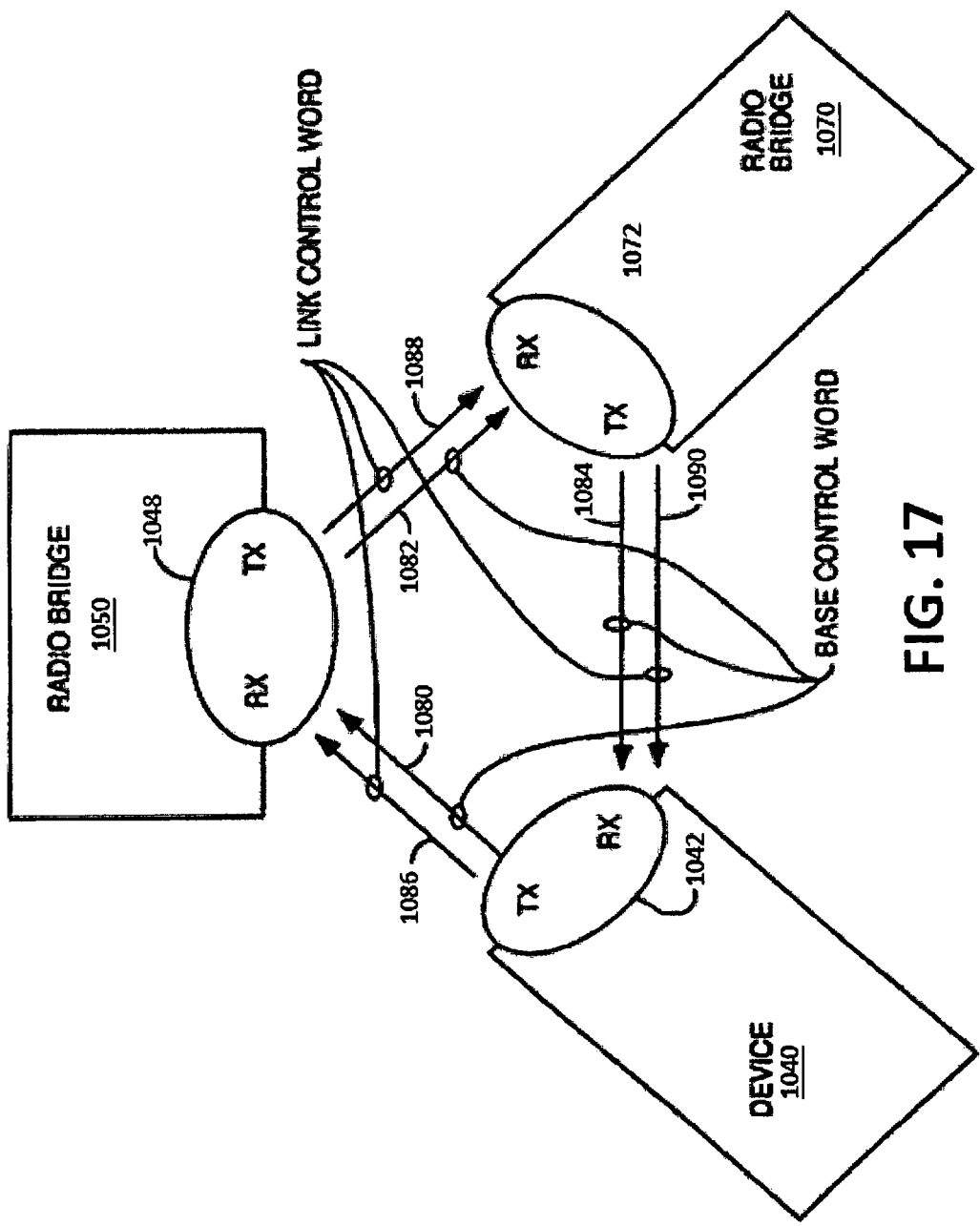
FIG. 17

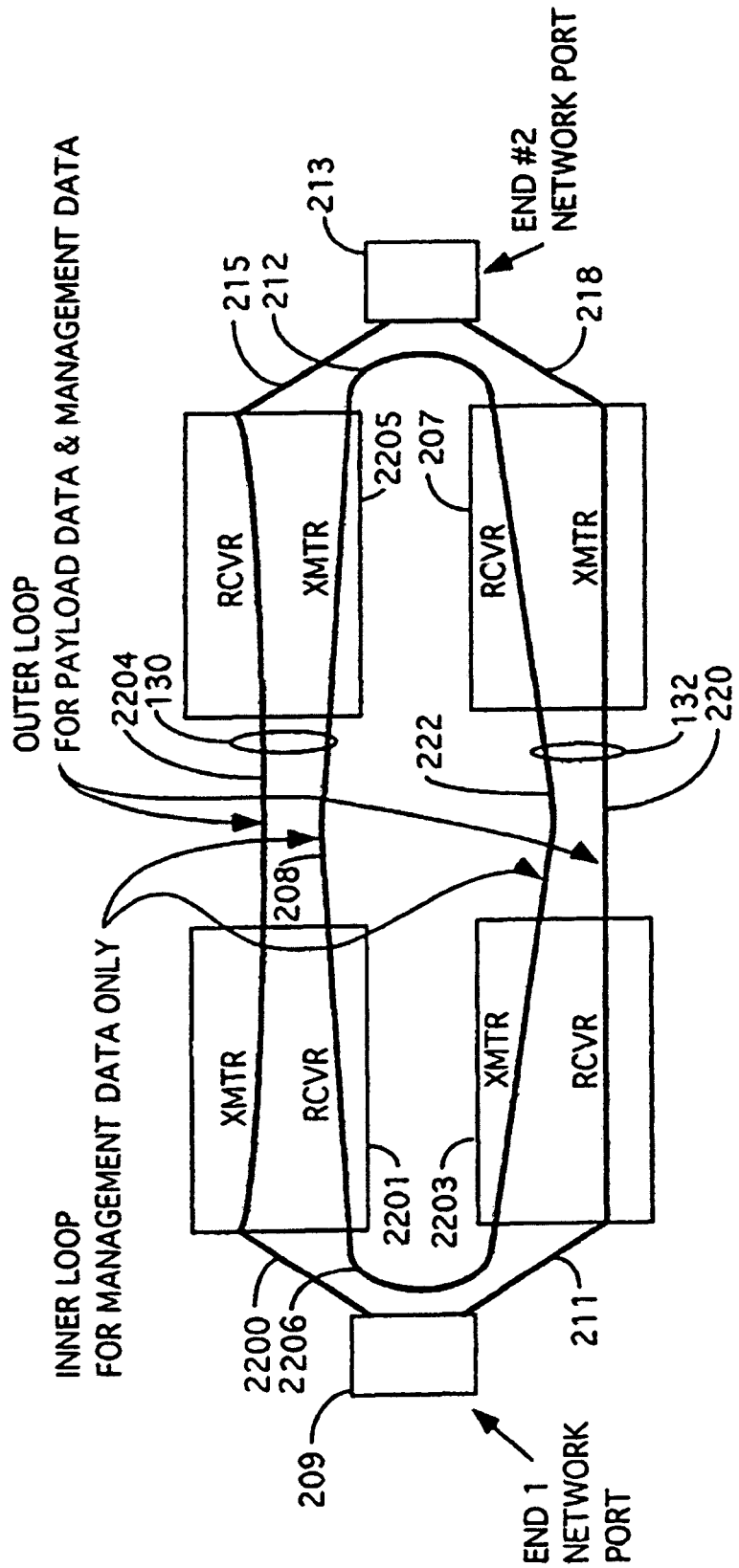
FIG. 18

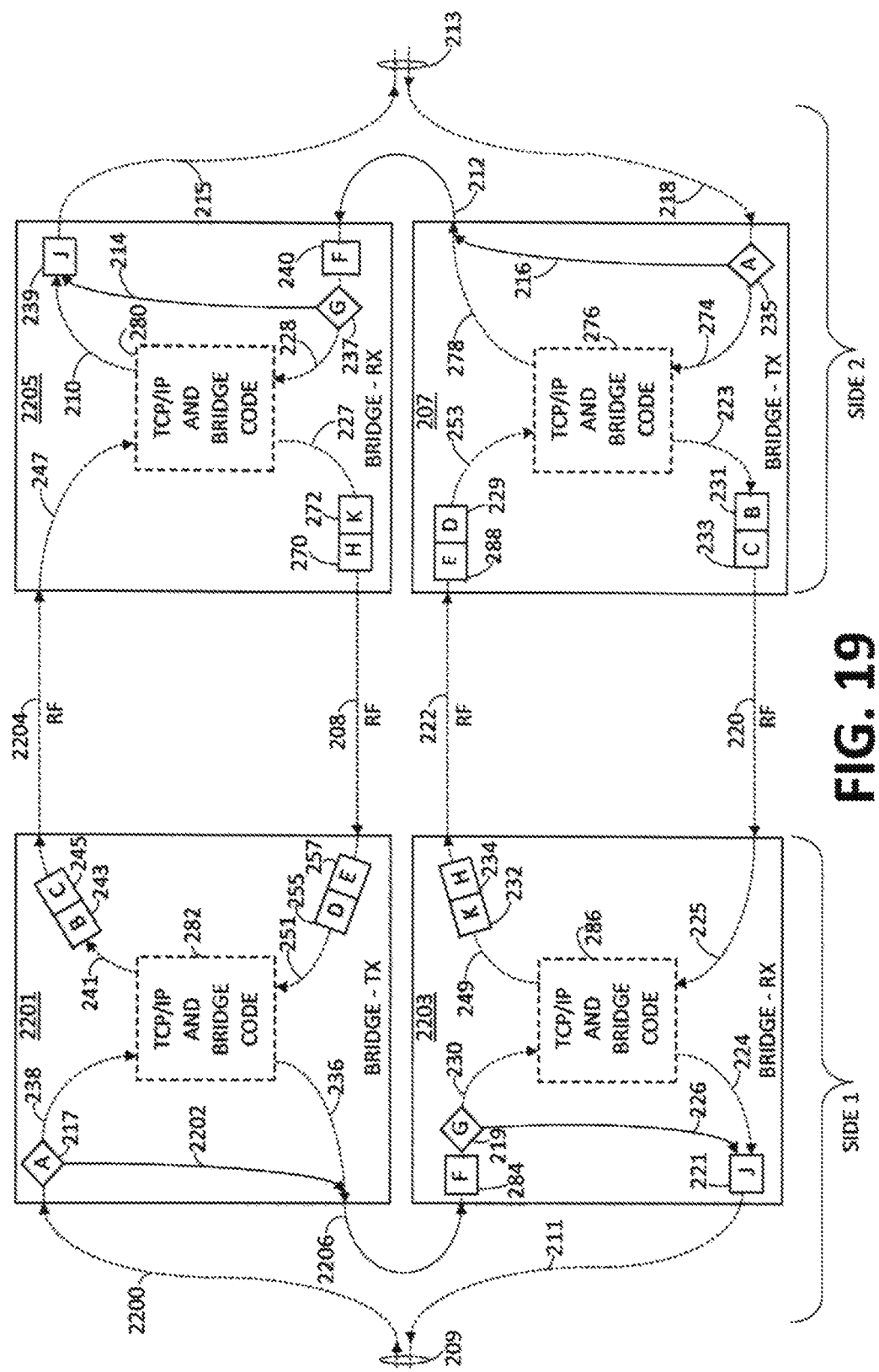
FIG. 19

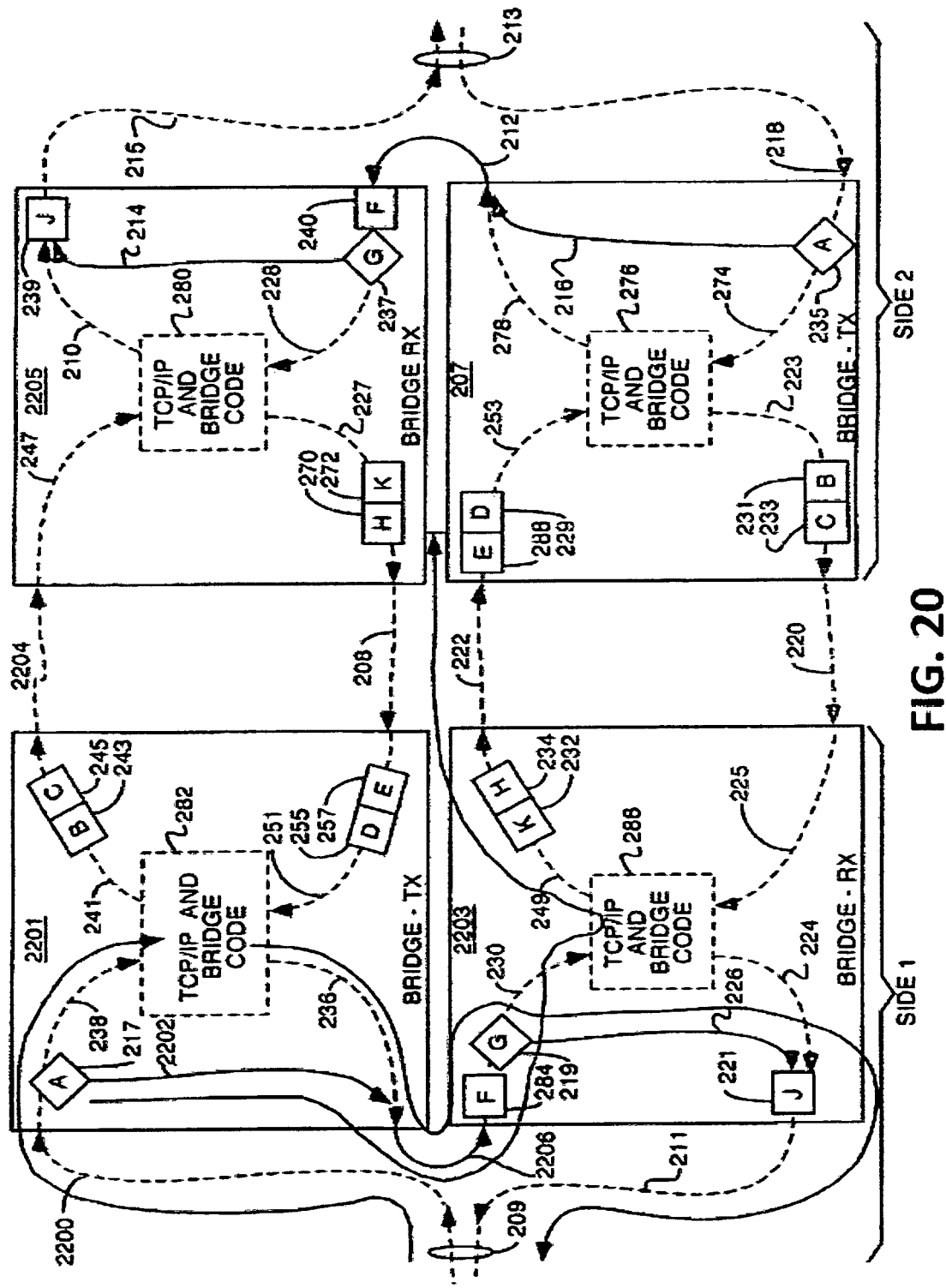
FIG. 20

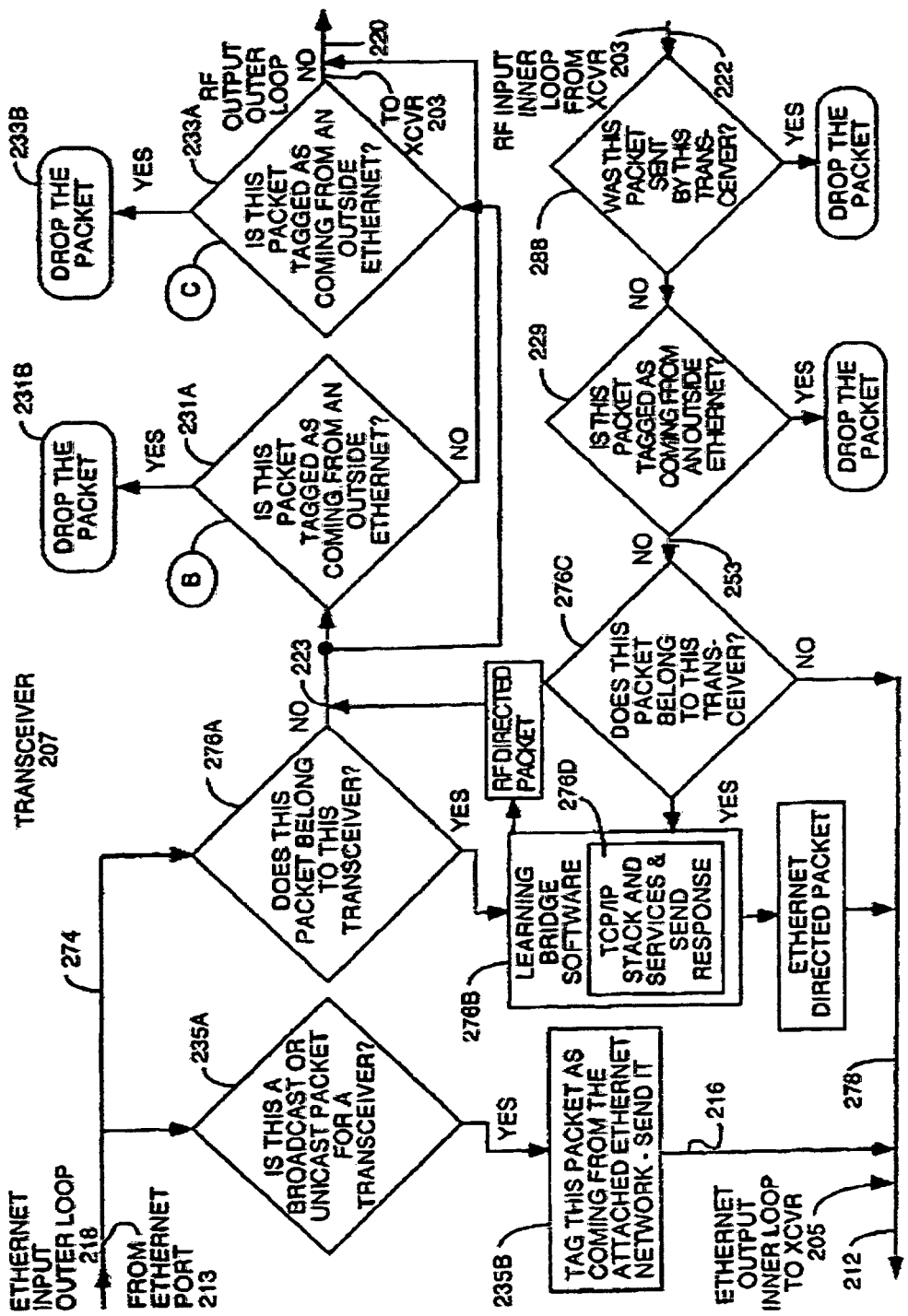
FIG. 21

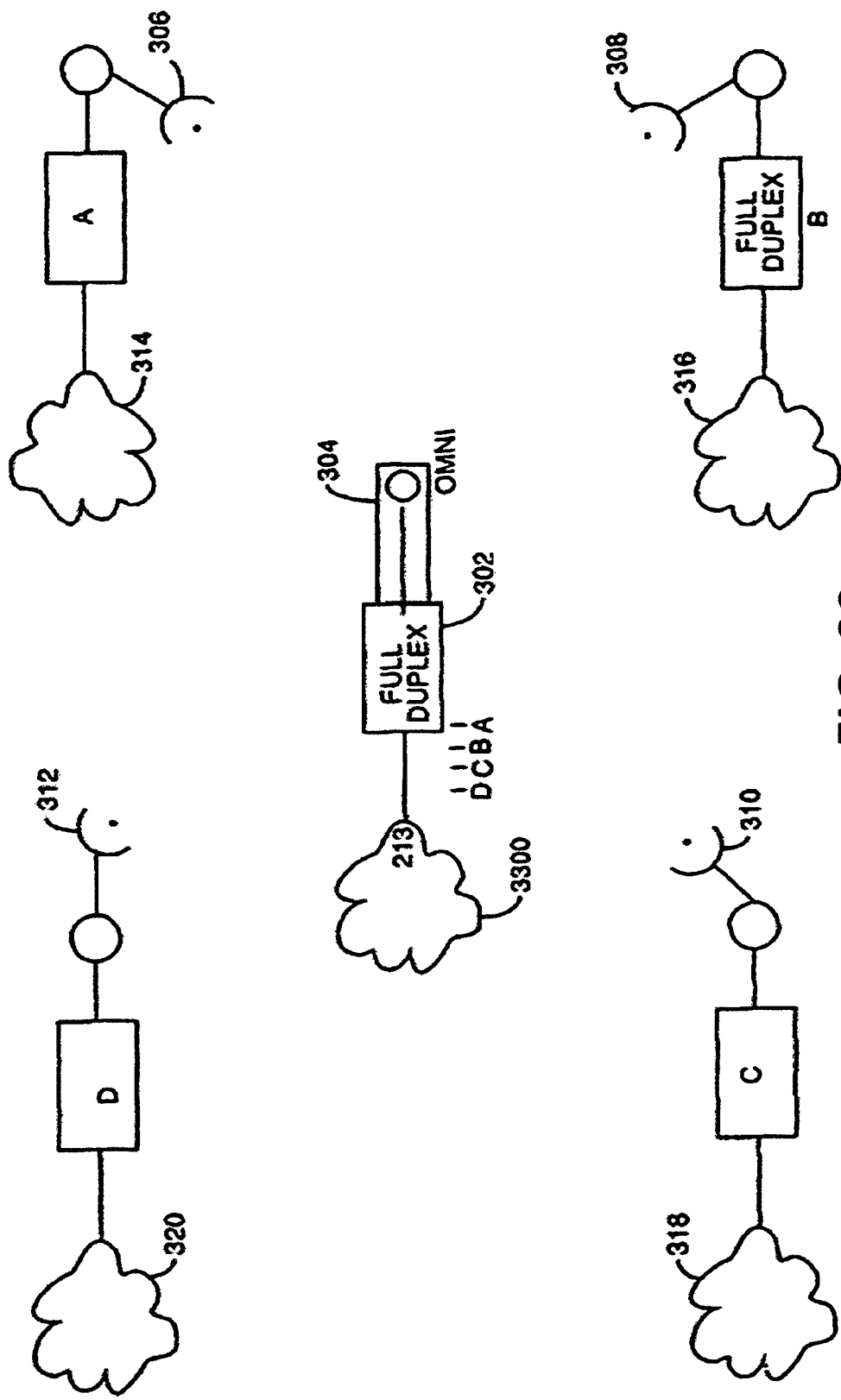
FIG. 22

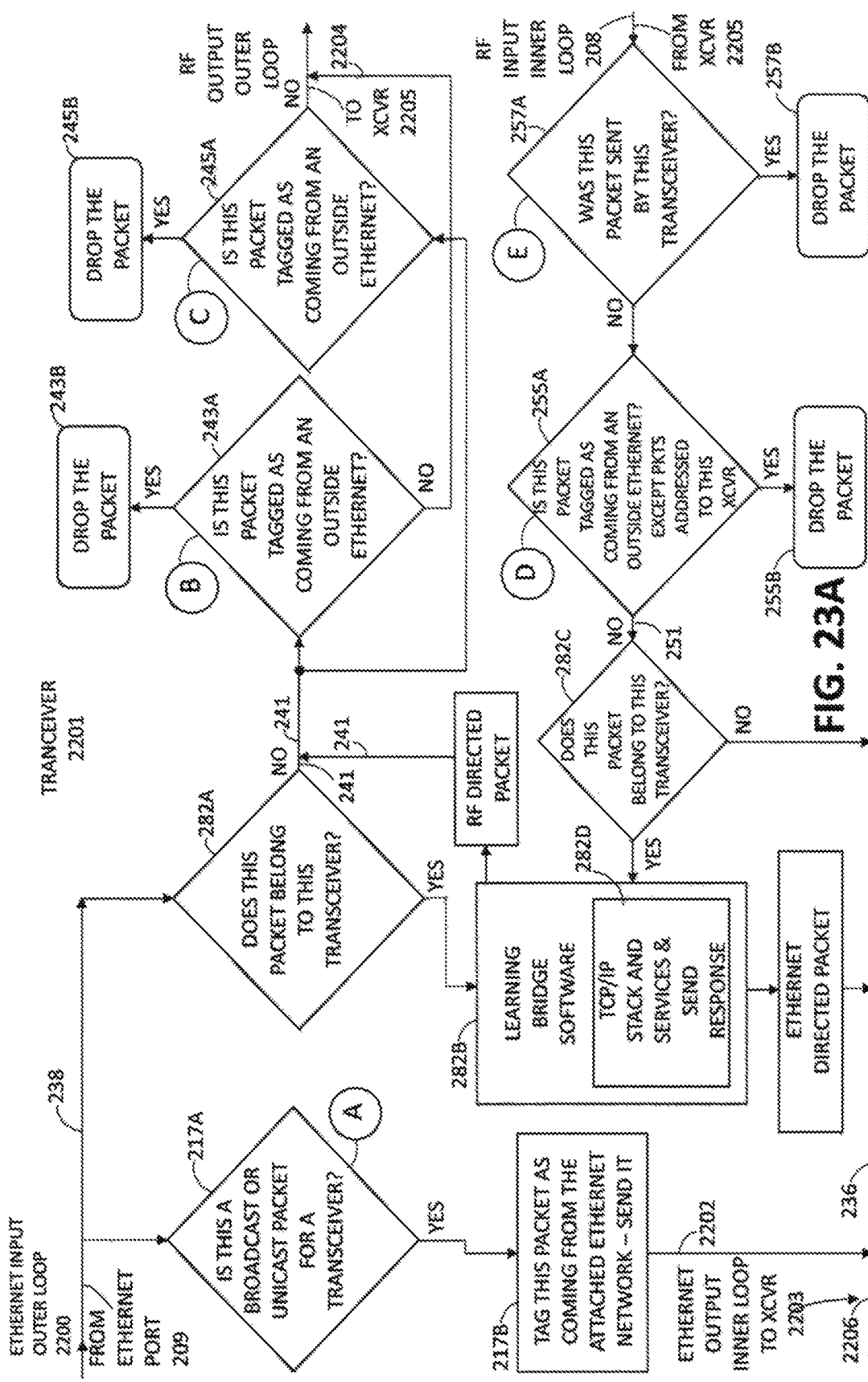
FIG. 23A

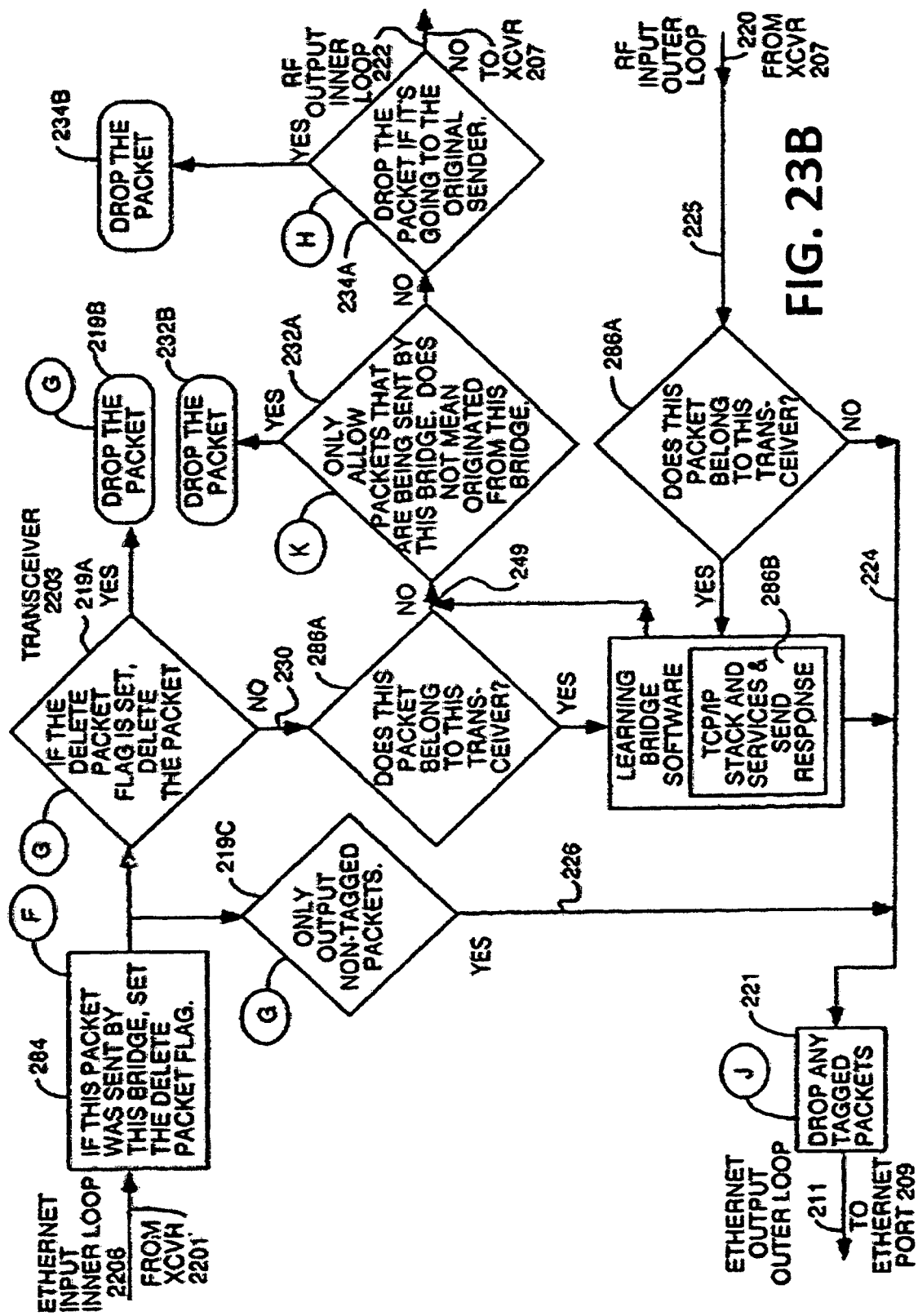
FIG. 23B

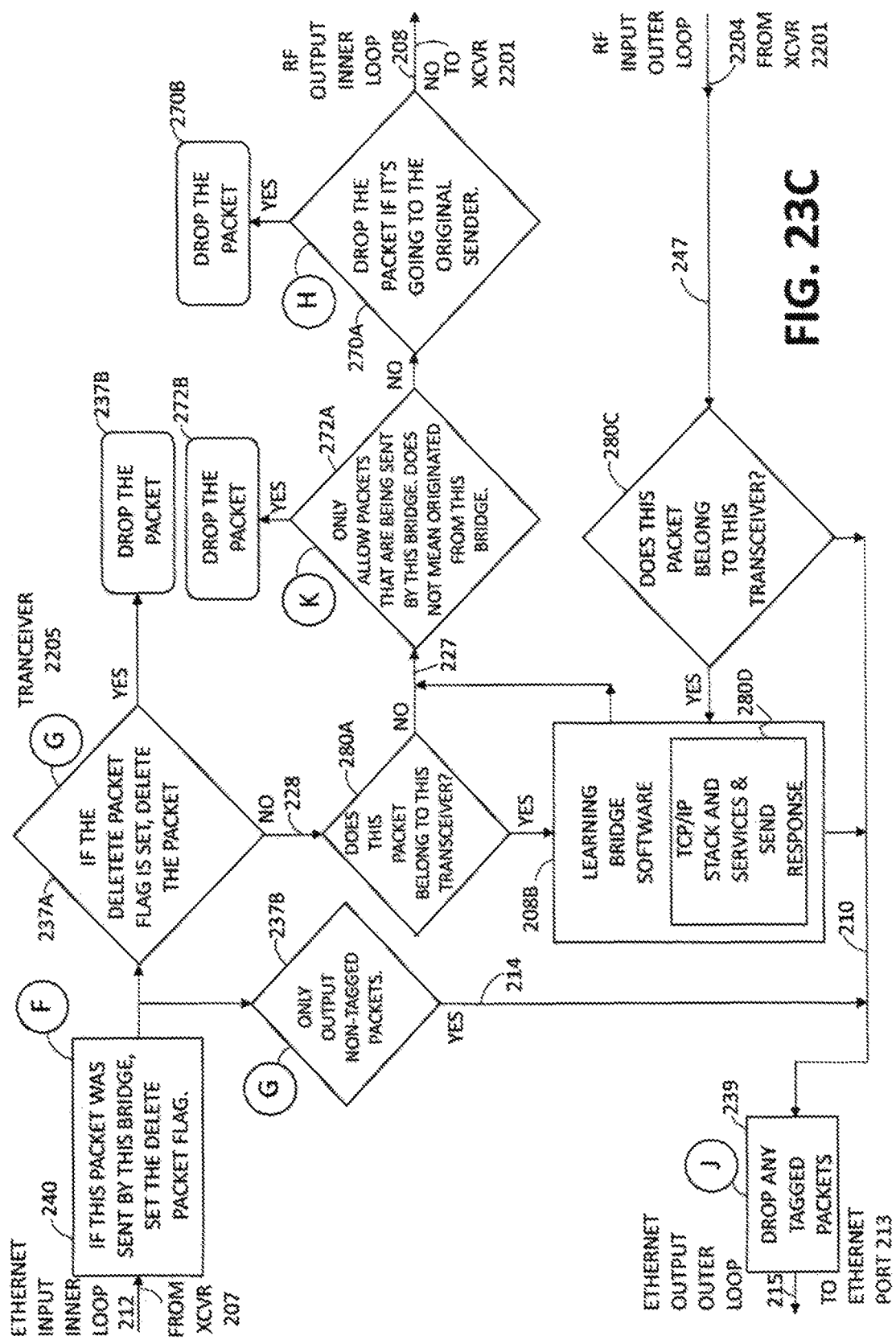
FIG. 23C

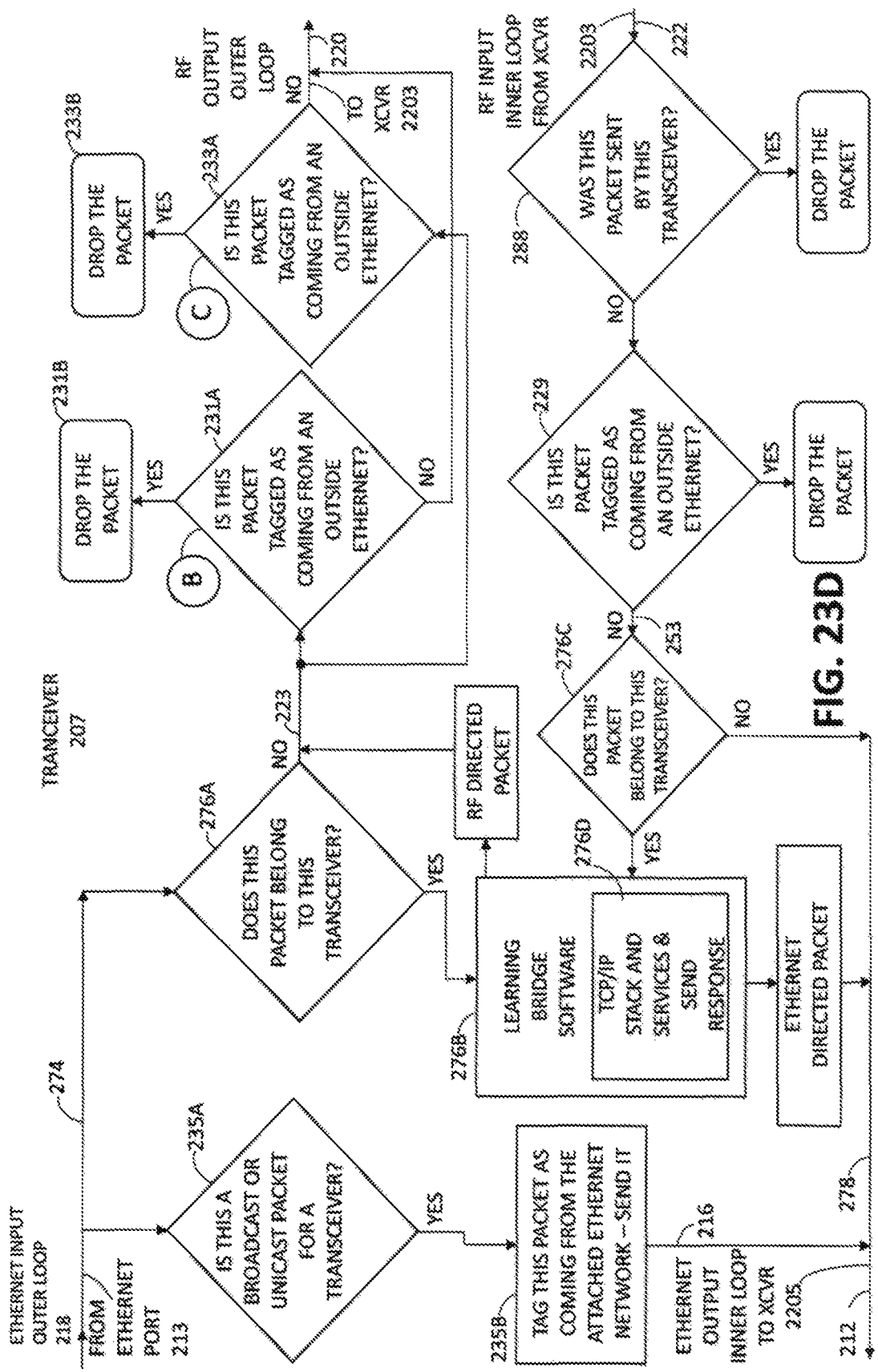
FIG. 23D

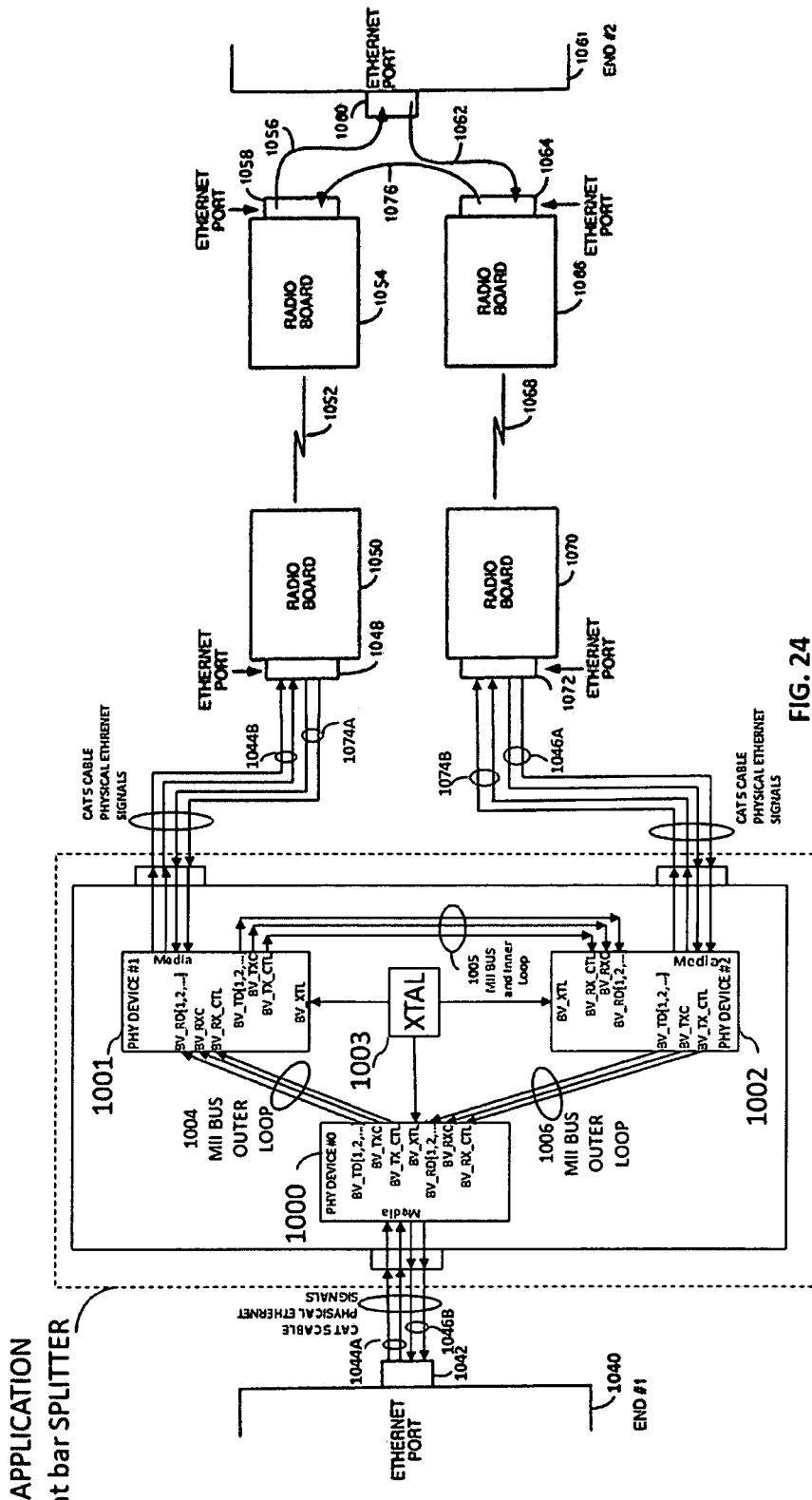
FIG. 24

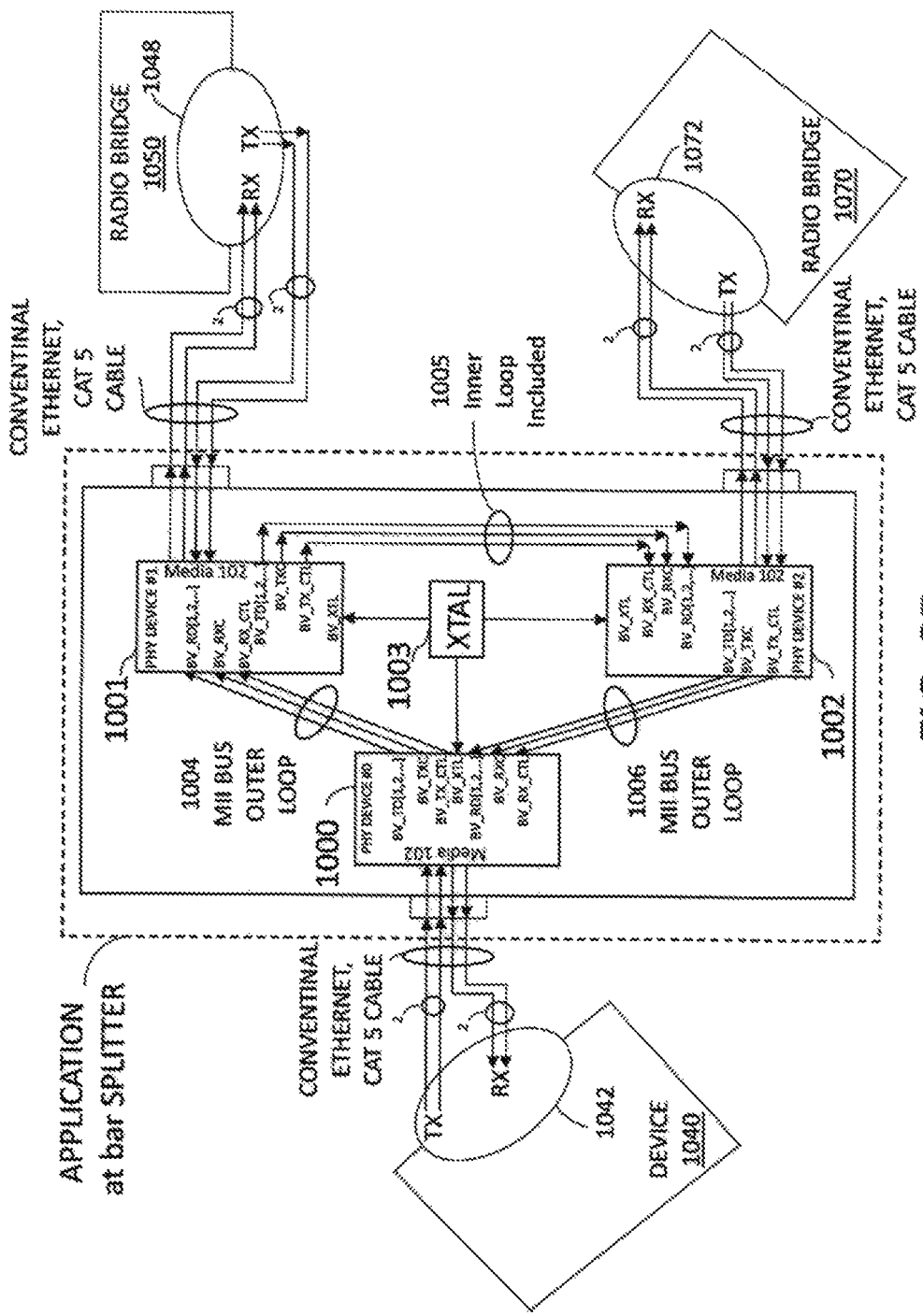
FIG. 25

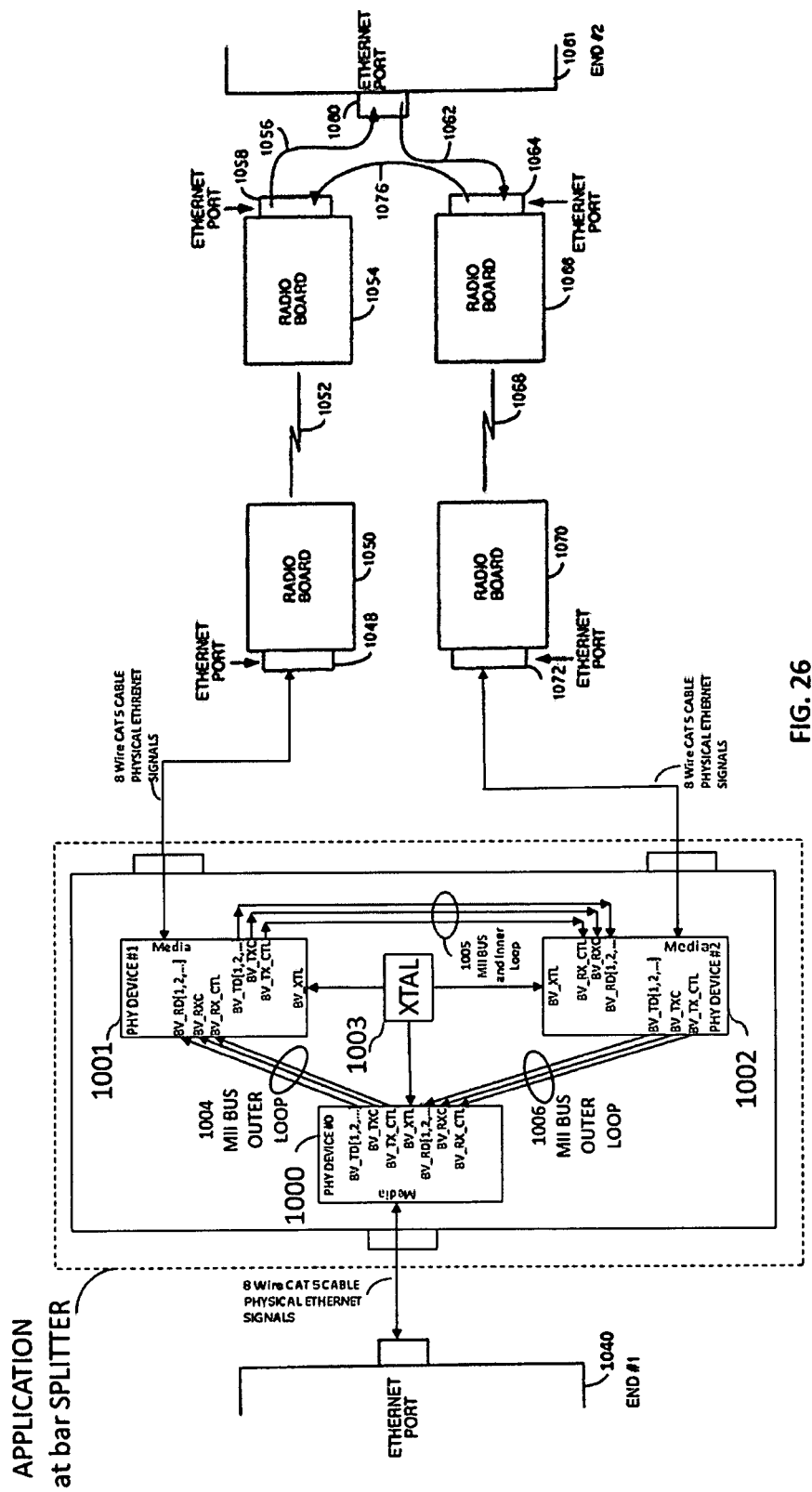
FIG. 26

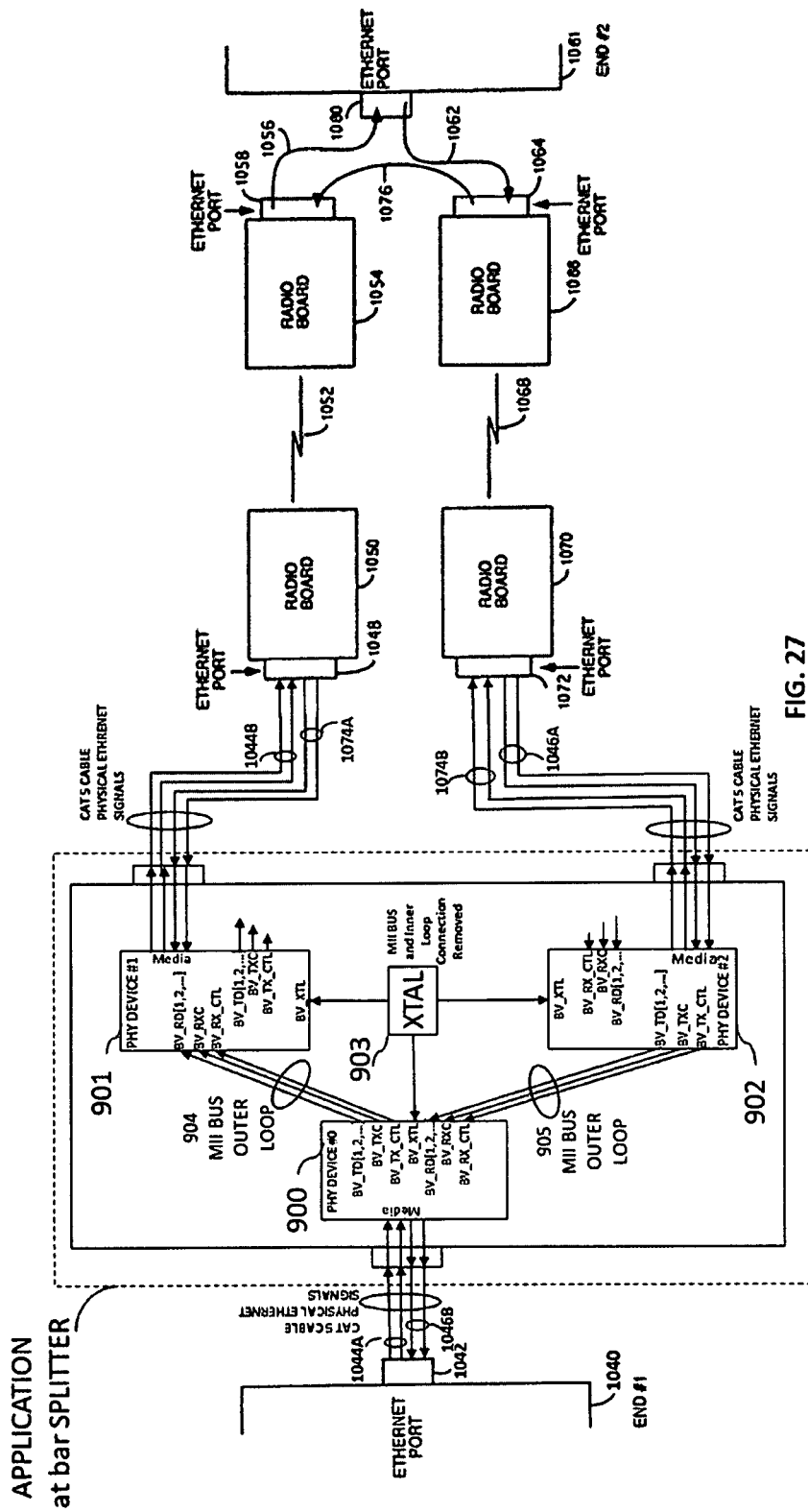
FIG. 27

MULTI-MEDIA FULL DUPLEX PACKET DATA SPLITTER

RELATED U.S. APPLICATION DATA

This application is a continuation-in-part (CIP) application of U.S. patent application Ser. No. 12/800,091, filed on May 7, 2010, currently co-pending, which is divisional application of U.S. patent application Ser. No. 11/890,165, now U.S. Pat. No. 7,751,350, filed Aug. 3, 2007, Entitled, "FULL DUPLEX NETWORK RADIO BRIDGE WITH LOW LATENCY AND HIGH THROUGHPUT", all of which have the same inventor. The disclosures of the above applications are incorporated herein by reference in their entirety.

OTHER PUBLICATIONS THAT MAY BE RELEVANT

IEEE Std. 802.3-2002 Section Three—35. Reconciliation Sub-layer (RS) and Gigabit Media Independent Interface (GMII) pp. 5-31.

IEEE Std. 802-3-2002 Section Two—22. Reconciliation Sub-layer (RS) and Media Independent Interface (MII) pp. 9-49.

Vitesse Corporation, VSC8601 Data Sheet, Chapter 2, Product Overview, September 2009, pp. 14-19.

Broadcom Corporation, HP Corporation, Marvell International Ltd., Reduced Gigabit Media Independent Interface (RGMII), Apr. 1, 2002, pp. 3-8.

Lattice Semiconductor Corp., RGMII to GMII Bridge Reference Design RD1022, April, 2011, pp. 2-3.

Xilinx Corporation, Using the RGMII to Interface with the Gigabit Ethernet MAC Application Note, Sep. 28, 2006, pp. 2-8.

BACKGROUND OF THE INVENTION

In the movement of network data packets, the overhead of moving a packet from one network device to another network device is known as latency. When bridging network data packets from one media to another media, mostly of different speeds, the packets are temporarily stored for preparation to be sent out the other media. This is known as store-and-forward. When combining two wireless, half duplex links, to form a full duplex link, extra packet store-and-forward's occur when gateways are introduced at either end of the link to control the flow of packets and prevent loops from occurring on the network. Removing the gateways by which the packet travels over the network improves the latency, which means better performance over the connection for the user.

With the development of the PHY (Physical Layer in the OSI Model), MAC (OLI Model Layer 2—data link layer), and the digital interface bus by which the MAC and PHY communicate, called the MII bus, the IEEE has defined a much simpler way for network devices to be developed and interoperate with each other. Newer variants of the MII bus have been developed, allowing many different bus definitions with much better functionality.

BRIEF DESCRIPTION OF THE SEVERAL VIEWS OF THE DRAWINGS

The present invention will become more fully understood from the detailed description and the accompanying drawings, wherein:

FIG. 1 is a prior art high level block diagram of the a commercially available Reduced Gigabit Media Independent Interface, know as RGMII, PHY chip.

FIG. 2 is a prior art high level block diagram of an Industry Standard RGMII interface, digitally connecting the RGMII PHY chip to the RGMII MAC interface, while showing the media connection, with the magnetics and RJ45 connector, for 10/100/1000BASE-T IEEE 802.3 compliant network connection.

FIG. 3 is a prior art high level block diagram of an Industry Standard RGMII interface, digitally connecting the RGMII MAC interface to the RGMII PHY interface with the system clock oscillator provided by the RGMII MAC interface.

FIG. 4 is a prior art high level block diagram of an Industry Standard RGMII interface, digitally connecting the RGMII PHY interface to the RGMII PHY interface with an external oscillator.

FIG. 5 is a prior art high level block diagram of an Industry Standard RGMII interface, digitally connecting the RGMII MAC interface to the RGMII MAC interface with external oscillator and optional clock delay.

FIG. 6 is a prior art high level block diagram of an a bridging glue logic used to interconnect and industry standard GMII MAC Interface to industry standard RGMII PHY Interface.

FIG. 7 is a high level block diagram representing two devices with the same MII bus variant interfaces, known as a the Generic Interface, representing the digital interface and functionality of either a PHY or a MAC with external systems clock oscillator.

FIG. 8 is a high level block diagram of two devices, with different MII bus variant interfaces, also known as the Generic Interface, with Glue logic attached to the digital interface, to bridge the two different MII bus variants, allowing the Network Connections for either device to communicate.

FIG. 9 is a high level block diagram of the Multi-Media Full Duplex Packet Data Splitter, without Network Management Packet Support, using the Generic Interfaces with the same MII bus variant.

FIG. 10 is a high level block diagram of the Multi-Media Full Duplex Packet Data Splitter, with Network Management Packet Support, using the Generic Interfaces with the same MII bus variant.

FIG. 11 is a high level block diagram of the Multi-Media Full Duplex Packet Data Splitter, without Network Management Packet Support, using the Generic Interfaces with different MII bus variants with the addition of Glue logic.

FIG. 12 is a high level block diagram of the Multi-Media Full Duplex Packet Data Splitter, with Network Management Packet Support, using the Generic Interfaces with different MII bus variants with the addition of Glue logic.

FIG. 13 is block diagram of one embodiment of an Ethernet radio bridge which solves the loop problem and which does not require either a managed hub or commercial level router to solve this problem.

FIG. 14 shows a sequence of normal link pulses, used by 10BaseT devices to establish link integrity.

FIG. 15 shows three trains of fast link pulses used by autonegotiating devices to declare their capabilities.

FIG. 16 shows how a link code word a 16 bit word is encoded in a fast link pulse burst.

FIG. 17 shows the propagation of the Ethernet Base Control Work and Link Control Word over the inner loop to allow activation of each link to the radio transceivers even though the each radio transceiver's Ethernet link is unidirectional.

FIG. 18 is a diagram of the inner and outer loops and their corresponding ports in the pair of radio bridges.

FIG. 19 is a diagram which illustrates the inner and outer loop data paths and the various software modules which make the inner loop/outer loop routing decisions.

FIG. 20 illustrates the request path, response path and extra paths traveled by the request packet and response packets for the scenario of row 1 of Table 1 where the packet source is the Ethernet port 209 and the incoming packet from Ethernet port 209 is either a broadcast packet or a unicast management packet addressed to transceiver 2201.

FIG. 21 illustrates the request path, response path and extra paths traveled by the request packet and response packets for the scenario of row 2 of Table 1 where the packet source is the Ethernet port 209 and the incoming packet from Ethernet port 209 is either a broadcast packet or a unicast management packet addressed to transceiver 2203.

FIG. 22 is a diagram of how the full duplex radio bridge may be used in a multipoint-to-point or point-to-multipoint configuration.

FIG. 23, comprised of FIGS. 23A, 23B, 23C and 23D, is a flowchart of the functionality of the transceivers of the prior art radio bridges as modified by the addition of various routing and filtering functionality (which cab be implemented either in hardware of software) to be within the genus of new embodiments disclosed herein.

FIG. 24 shows the MII BUS Splitter, Layer 2, FIG. 10, inserted into the Layer 1 10/100BASE-T Ethernet Signals 1044, 1046, and 1074 of Parent FIG. 13, showing NEW Material Interoperating as END #1 Bridge.

FIG. 25 shows the MII BUS Splitter, Layer 2, FIG. 10, inserted into the Layer 1 10/100BASE-T Ethernet signals of Parent 17 Negotiation Path, moving the negotiations out to the 3 Ethernet connections.

FIG. 26 shows the MII BUS Splitter, Layer 2, FIG. 10 inserted into the Layer 1 1000BASE-T Ethernet Signals of Parent FIG. 13 and adding the new material, showing interoperability with the Parent bridge on END #2.

FIG. 27 shows the use of FIG. 9 of the MII BUS Splitter allowing the bridge to pass data between the networks without Network Management Access to the bridge from the END #1 connection, while showing interoperability with the Parent bridge on END #2.

DETAILED DESCRIPTION OF THE PREFERRED AND ALTERNATIVE EMBODIMENTS

The presently claimed technology improves the inventor's previous invention, disclosed in U.S. patent application Ser. No. 12/800,076, filed May 7, 2010, now U.S. Pat. No. 8,437,283. In the previous invention, splitting of the layer 1 media transmit signals (data and link control) and the receive (data and link control) was done so that the transmit port of a first device would be coupled to the receive port of a second device, and the transmit port of the second device was coupled to the receive port of a third device. The transmit port of the third device was coupled to the receive port of the first device. This created a ring topology which had the benefit of preventing the extra store and forward which would result from use of a gateway.

The improvement claimed here is done by moving the splitting of the transmit data and control signal paths and receive data and control signal paths that create the ring topology. This splitting function is moved to the MII bus. The MII bus separates the data link layer of the OSI model (MAC) and the physical link layer of the OSI model (PHY).

The present technology also improves the method of providing connectivity by making the embodiments of the technology claimed media independent so that CAT 5 or fiber optic or copper wires or future media may be used. This prevents the need for developing a new version of the technology for every media type and data rate that exists or will exist in any future product. The support of these media types, also allows for easier and faster development to support increased data rates. This improvement is implemented simply by changing the PHY layer chip 201 in FIG. 2. In FIG. 7, the PHY layer chip is not shown, only a set of generic bus signals is shown which are a variant of the MII bus signals. These generic bus signals can be derived from any PHY chip regardless of the physical media in use. The claimed technology can implement a ring topology between any combination of three PHY chips or bus variants and MAC chips or bus variants. The ring can even be comprised of three MAC layer chips or bus variants coupled together. A bus variant is defined below herein.

These factors have lead to making the MII bus or a variant of the MII bus a logical place to improve on the prior art and implement the claimed technology. The terms MAC, PHY, and many others are explained in IEEE Standard 802.3ae (30 Aug. 2002), which is incorporated herein by reference in its entirety.

The Media Independent Interface (MII) was originally defined as a standard interface by the IEEE, used to connect a Fast Ethernet MAC-block to a PHY chip. The MAC represents a Layer 2 sub-layer of the OSI model, while the PHY is the implementation of Layer 1 of the OSI model. The digital signals that transfer data and control between the MAC and the PHY are referred to as the MII bus. The MII bus design has been extended in new variants to support reduced numbers of signals, increased speeds and increased design flexibility. Current bus variants of the MII bus are named Reduced Media Independent Interface (RMII), Gigabit Media Independent Interface (GMII), Reduced Gigabit Media Independent Interface (RGMII), Serial Gigabit Media Independent Interface (SGMII), 10 Gigabit Media Independent Interface (XGMII), 40 Gigabit Media Independent Interface (XLGMII), and 100 Gigabit Media Independent Interface (CGMII). In the previous invention, the splitting into a ring topology allowed three Ethernet devices to talk to each other because the devices were tricked in the handshake protocol involving the link control word and base control word. Normally, a first Ethernet device sends out a first control signal (base control word) to a second Ethernet device, and expects to get back a second control signal (link control word) back from the second device. The ring topology in the previous invention allowed the first device to send the first control signal to the second device and receive the second control signal back from the third Ethernet device. Thus, as far as the first device was concerned (as was the case for the second and third devices), the handshake was complete and data transmission could begin. This allowed three devices to talk to each other as opposed to two without the need for a switch or router or gateway thereby eliminating a store and forward latency. The ring topology also had management advantages because it allowed the establishment of an inner loop and outer loop in a full duplex radio bridge involving four transceivers. The inner loop allowed management signals to be sent to any of the four transceivers. Payload data was actually transmitted only on the outer loop.

The claimed technology is basically the same idea implemented on the interface between the PHY and MAC layers. In the previous invention, the ring topology was implemented strictly on the PHY layer. When the technology moved to gigabit Ethernet, all eight wires were used in a bidirectional mode. That frustrated the implementation of the original invention, so a new technology to achieve the same advantages was needed even though the protocols for communication changed. In the previous invention, there was a handshake where a first device sent a base control word to a second device as part of a negotiation prior to transmission of payload data. The idea was to find out if there was another device on the other end and negotiate a speed of transmission. If the first device got back a link control word from the second device indicating what the maximum speed capability to receive were, the negotiation was complete and a speed had been agreed upon. The prior invention tricked the first, second and third devices into thinking they had successfully completed this negotiation even though the link control word they got back was not from the device to which they sent the base control word.

In the MII bus and its variants, this handshake protocol no longer exists. Now, in the MII bus and its variants, all devices have to be able to transmit and receive at the same speed, and all devices use the same clock, as represented by chrystal 1003 in FIG. 10. So there is no need for the negotiation of speed any longer. Now, to implement the claimed technology and achieve a ring topology, there is no need to trick the three devices in the ring any longer. All that is necessary to achieve the ring topology in the MII bus and its variants is separation of the transmit and receive data and control paths, and the ability of the three devices in the ring to transmit and receive using the same clock. The devices in the ring do not care to which other device they are transmitting and from which other device they are receiving. This separation of transmit and receive signal paths and use of a common clock for all devices is at the heart of the implementation of the ring topology in the MII bus and its variants. It is the ability to implement a ring topology which gives the advantage of elimination of a router, switch or gateway and its inherent latency and yet allows three devices to talk to each other.

Some of these variants are defined by the IEEE standards committee, while others are defined by one or more different organizations to improve and advance the technology without the overhead caused by large standards bodies. The loosely connected associations, working together, to define and implement new technologies, develop what is known as a Multi-Source Agreements (MSA). The benefit of an MSA, it can be negotiated more quickly with fewer contributors than a large standards committee. An example of the MSA is the RGMII variant that was developed by Broadcom, HP, and Marvell. The document is titled "Reduced Pin-count Interface For Gigabit Ethernet Physical Layer Devices". The RGMII MSA only defines the digital bus signals of the PHY device, while using the IEEE standards committee for the media interfaces for 10-BASE-T, 100-BASE-T and 1000-BASE-T Ethernet. The use of MSA's and the work done by standards bodies, newly defined solutions will continue to define with new MII bus variants in the future. These new definitions of MAC or PHY chip technologies can redefine the variants of the MII bus design and/or the media interface by which data will be sent and received. The embodiment takes advantage of these new and/or existing standards by redirecting the variants of the MII bus, controlling the transmit data, transmit control signals, the receive data and receive control signals for a network connection.

The MSA's, for each variant of the MII family of devices, have defined one method for transmitting data and one method of receiving data. With the digital design of the MAC digital interface for a specific variant of the MII bus standard being performed by many different organizations and the PHY digital interface also designed by many organizations, the two transmit sections and the two receive sections, of the MAC and PHY, for the same defined standard, are the same from these organizations. The interoperability between multiple manufactures of both MAC and PHY interfaces provides the best solutions for the product developer.

Referring now to FIG. 1, a prior art high level block diagram of an RGMII PHY chip is shown, and used to define the many features provided in the PHY chip. There is a Management and Control Interface, JTAG, Power Regulation, LED Interface, MDI Reference, MDI Twisted Pair Interface, along with the RGMII MAC digital interface bus 100, used to communicate with an attached device. RGMII is a variant of the MII. The PLL interface 101 is used for the system clock oscillator.

Referring now to FIG. 2, there is shown a prior art high level block diagram of the data path from the RGMII MAC Interface 200, over the variant of the MII bus 204, through the RGMII PHY chip 201, the 10/100/1000Base-T media connection from the PHY chip 206, through the Magnetics and the RJ45 connector 202, and then over the Ethernet cable 205 to a Packet Data Network Connection 203. The MAC interface 200 can be to any device such as a network processor, switch chip, etc.

Referring now to FIG. 3, there is shown a prior art definition of the RGMII digital bus interface signals between the RGMII MAC Interface and the RGMII PHY Interface. The signal definitions, data transmit timing, control and error handling are defined in the "Reduced Gigabit Media Independent Interface" specification. The signal names on the PHY chip, 300 and 301 are in the context of the MAC naming convention. In the most common usage of this interface, the oscillator signal 302 for the PHY chip is provided by the MAC interface. This method is used to allow the oscillator to be changed by the computing device that the RGMII MAC Interface is attached. This allows software in the MAC interface to set the speed of the oscillator to allow the Packet Data Network Connection to run at the selectable speeds of 10, 100, or 1000 Mbps, representing 10/100/100Base-T of the IEEE specification. The speed of the oscillator sets the speed of data transfer.

Referring now to FIG. 4, there is shown a prior art interface between two RGMII PHY chips, digitally connected, in a back-to-back fashion, using the digital RGMII bus. The transmit data and control signals data paths of PHY interface 400 connect directly to the receive data and control signals digital path inputs of the PHY interface 401. Also, the transmit data and control signals data paths of PHY interface 401 connect directly to the receive data and control signals data path inputs of PHY interface 400. In this design, external crystal oscillator, 402, is required. This external oscillator is used to provide the PHY chip with the necessary clock rate for the desired speed of the media connection. As defined in the RGMII specification, if a 2.5 MHz clock is provided, the operational speed of the PHY chip and its media will be 10 Mbps. If a 25 MHz clock is provided, the operational speed of the PHY chip and its media will be 100 Mbps, and if a 125 MHz clock is provided, the operational speed of the PHY chip and its media will be 1000 Mbps.

Referring now to FIG. 5, there is shown a prior art interface between two RGMII MAC chips, digitally connected, in a back-to-back fashion, using the digital RGMII bus. The transmit data and control signals data paths of MAC chip 500, connect directly to the receive data and control signals data path inputs of MAC chip 501. Also, the transmit data and control signals data paths of MAC interface 501 connect directly to the receive data and control signals data path inputs of MAC interface 500. In this design, an external crystal oscillator, 502, is required. This external Oscillator is used to provide the MAC interface with the necessary clock rate for the desired speed of data transfer between the interfaces. The speed requirement of this interface may only be limited by the speeds of the circuitry that the MAC interface is attached.

Referring now to FIG. 6, there is shown a prior art connection between a PHY interface and a MAC interface and showing the addition of extra circuitry between the GMII MAC bus interface and the RGMII bus interface. The additional circuitry, known as glue logic, is used in this case to translate the bus interface from one interface type to the other interface type. This arrangement provides full duplex, synchronous data communications between the GMII MAC interface and the RGMII PHY interface. The glue logic is divided into two distinct modules, one with GMII inputs and RGMII outputs 600, and the other glue logic module having RGMII inputs and GMI outputs, 601. This is a common solution for connecting different variants of the MII bus interfaces. Using the Glue logic, allows the connecting of different Media types with different variants of the MII bus interfaces implemented on a variety of devices. The glue logic can be expanded to include extra timing, status, control, data manipulation, monitoring, variants of the MII bus, or circuitry necessary for the two interfaces to be connected and function correctly. The use of glue logic between any variant of the MII bus interfaces will be treated as a means of bridging the data from one variant of the MII interface to the other variant of the MII interface. This arrangement can be used in a half duplex, one directional data flow, or full duplex, two direction data flow implementation. The glue logic between PHY to PHY communications and MAC to MAC communications is also treated as a method of bridging data between the interfaces or devices in half duplex or full duplex operation.

Referring now to FIG. 7, there is shown a prior art set of MII bus variant signals that represent all signals necessary to allow full duplex communications between the Generic Interface 700 and the Generic Interface 701, both having the same MII bus variant signals. This type of connection can occur in the prior art, and is shown here simply to define the minimum set of signals needed to implement the claimed technology as shown in later diagrams. The Generic Interface 700 and the Generic Interface 701 each represents any MAC or PHY interface type of device that has a bus interface which is a variant of the MII bus. The Generic Interfaces 700 and 701 show a subset of all possible MII bus variant signals for the data, control, status and error handling that are needed to implement the claimed technology. The use of Generic Interface, represented by BV_TD[1,2, . . . ], BV_TXC, BV_TX_CTL, BV_RD[1,2, . . . ], BV_RXC, BV_RX_CTL, and BV_XTAL signals, provides a general way of representing all possible signals for any single variant of the MII bus signals needed for implementation of the claimed technology. The above named signals are as follows:

BV_TD[1,2, . . . ]—this is the payload data path in most implementations although there may be control signals included on some of the lines in some implementation, and can be comprised of from 1 to any number of lines;

BV_TXC—this is the transmit data path data strobe clock line;

BV_TX_CTL—this is the transmit data path control status or error signal line;

BV_RD[1,2, . . . ] this is the receive data path and can be comprised of from 1 to any number of lines;

BV_RXC—this is the receive data path strobe clock;

BV_RX_CTL—this is the receive data path control status or error signal line; and BV_XTAL—this is the system clock line.

The claimed technology can be used on any current variant of the MII bus or any variant developed in the future and is not limited in the number of signals needed or the number of bus variants that can be used when sending or receiving communications between one Generic Interface and another. The actual signals used to implement the claimed technology are set by the requirements of the design, but the flow of the signals is unique in the claimed technology.

Crystal oscillator 704 provides a common clock signal to generic interface 700 and generic interface 701.

The Generic Interfaces 700 and 701 show just the bus variant signals at the interfaces 702 and 703, but the Generic Interface blocks 700 and 701 themselves represent all the connecting circuitry which allows the data being received by the Generic Interface to be sent out onto the media (not shown) associated with the specific Generic Interface. The physical media of the network is coupled to the Generic Interfaces 700 and 702 (if they are both PHY interfaces) as shown in FIG. 2 at 206 for a PHY interface. If either of Generic Interface 700 and 701 is a MAC interface, it has no media connection because the MAC interface functions to receive control and data signals from a PHY interface and depacketize the data and send it to the circuitry or software of whatever piece of network equipment houses the Generic MAC Interface. The design of circuitry inside Generic Interfaces 700 and 701 is not part of the invention and is not critical and will be different depending upon the type of media the PHY interface is connected to or the type of network equipment the MAC interface serves.

In FIG. 7, transmit data path and control signals from Generic Interface 700 are coupled to the receive data path data and control inputs of Generic Interface 701. Likewise, transmit data path and control signals from Generic Interface 701 are coupled to receive data path data and control inputs of Generic Interface 700.

Referring now to FIG. 8, there is shown a prior art high level block diagram wherein the defined bus variant signals of a first Generic Interface, 800 are coupled to the defined bus variant signals of a second Generic Interface, 801 through two modules of glue logic 802 and 803 with a separate crystal oscillator 804 providing a common clock signal for both generic interfaces. Again, the media interface is not shown, and the Generic Interfaces 800 and 801 can be either MAC or PHY interfaces. The glue logic can be separated into two distinct circuits 802 and 803. Glue logic 802 functions to couple transmit data path and control signals from Generic Interface 800 to the receive data path data and control inputs of Generic Interface 801. Glue logic 803 functions to couple transmit data path and control signals from Generic Interface 801 to receive data path data and control inputs of Generic Interface 800. The glue logic 802 and 803 provides compatibility conversion for signals from Generic Interface 801 to Generic Interface 800. The use of glue logic is only necessary if for example, the voltage levels or timing considerations or the design of the bus require some manipulations for compatibility with the other Generic Interface to which a Generic Interface is coupled. The glue logic can be any other circuitry required by the design, but it does not form part of the invention except where needed to make the bus interfaces compatible. The Oscillator, 804, has been included with the glue logic to allow the glue logic the use of the Oscillator, but may not be required in the glue logic circuitry in some implementations.

Referring now to FIG. 9, a high level block diagram of an embodiment of the claimed technology is shown. In the embodiment of FIG. 9, only an outer loop data path is shown, and the inner loop used for management transmissions is omitted. The outer loop transmit data path is shown at 904. The outer loop receive data path is shown at 905. The inner loop data path is omitted since the advantages of the claimed technology can be achieved without the presence of an inner loop for management transmissions and the outer loop data path will operate full duplex without any problems. In other words, an inner loop management transmission data path is not necessary for full duplex data transmissions. The claimed technology may hereafter be referred to as a Multi-Media Full Duplex Packet Data Network Splitter. The Multi-Media Full Duplex Packet Data Network Splitter is shown in the embodiment of FIG. 9 without the Management or inner loop data path (which is shown in the embodiment of FIG. 10). The Multi-Media Full Duplex Packet Data Network Splitter transmits data from the Generic Interface 900 to the Generic Interface 901 on the Outer Loop data path 904. The Multi-Media Full Duplex Packet Data Network Splitter receives data at the Generic Interface 900 from the Generic Interface 902 via the Outer Loop data path 905. The transmit data and control signals of Generic Interface 900 are coupled to the receive data path data and control signal inputs of Generic Interface 901. The transmit data and control signals of Generic Interface 902 are coupled to the receive data path data and control signal inputs of Generic Interface 900. The system Oscillator, 903, is coupled to and provides common clock signal for synchronization of the three Generic Interfaces operations.

Referring now to FIG. 10, a high level block diagram of an embodiment of the claimed technology is shown. In the embodiment of FIG. 10, an outer loop data path is shown, and there is also shown an inner loop 1005 used for management transmissions. One segment of the outer loop transmit data path is shown at 1004. One segment of the outer loop receive data path is shown at 1006. The inner loop data path is not omitted in this embodiment despite the fact that the advantages of the claimed technology can be achieved without the presence of an inner loop for management transmissions and the outer loop data path will operate full duplex without any problems without management. In other words, an inner loop management transmission data path is not necessary for full duplex data transmissions. The inner loop data path 1005 functions to carry management transmissions which are used to manage devices not shown which are coupled to one or more of the Generic Interface 1000, 1001 and 1002. The claimed technology of FIG. 10 may hereafter be referred to as a Multi-Media Full Duplex Packet Data Network Splitter With Management. The Multi-Media Full Duplex Packet Data Network Splitter With Management is shown in the embodiment of FIG. 10 with the Management or inner loop data path at 1005. The Multi-Media Full Duplex Packet Data Network Splitter With Management transmits data from the Generic Interface 1000 to the Generic Interface 1001 on the Outer Loop data path 1004. The Multi-Media Full Duplex Packet Data Network Splitter With Management receives data at the Generic Interface 1000 from the Generic Interface 1002 via the Outer Loop data path 1006. The transmit data and control signals of Generic Interface 1000 are coupled to the receive data path data and control signal inputs of Generic Interface 1001. The transmit data and control signals of Generic Interface 1002 are coupled to the receive data path data and control signal inputs of Generic Interface 1000. The system Oscillator, 1003, is coupled to and provides common clock signal for synchronization of the three Generic Interfaces operations.

The claimed technology achieves its advantage in the embodiments of FIGS. 9 through 12 by the use of the common clock to synchronize data transmissions between the Generic Interfaces and by connecting the transmit data and control signal ports of one Generic Interface to the receive data and control signal ports of a second Generic Interface while having its receive data and control signal ports coupled to the transmit data and control signal ports of a third Generic Interface. This eliminates the latency of an additional store and forward device such as a router, switch, etc. which would otherwise be necessary to allow three Generic Interfaces to talk to each other. The common clock signal supplied by crystal oscillator 1003 sets the frequency of the data strobe clock signals on the outer loop data paths 1004 and 1006, but the data strobe clocks do not have to be synchronized with the common clock signal supplied by crystal oscillator 1003.

The IEEE is considering parallel use of the data lines from multiple PHY interfaces to send payload data of a single transaction on parallel paths to other PHY or MAC interfaces. Since it has been made clear herein that the number of lines in the transmit and receive data paths (such as transmit data path 904 and receive data path 905 in FIG. 9) does not matter, this new technology being considered by IEEE is within the scope of the invention. In other words, if multiple PHY and/or MAC interface chips are used in parallel in accordance with the claimed technology, they would be considered one first Generic Interface and used in the claimed technology by having their transmit data path data lines and transmit control signal lines used to transmit payload data to the receive data path and control signal inputs of a like number of PHY or MAC chips on a second Generic Interface, and the transmit data path data and control signal outputs of a third Generic Interface would be coupled to the receive data path data and control signal inputs of the first Generic Interface and all PHY interfaces or MAC interfaces would have their data strobe signals running at the same frequency as the common crystal clock.

Referring now to FIG. 11, a high level block diagram of an embodiment of the claimed technology is shown similar to that shown in FIG. 9 but with glue logic inserted on the outer loop data path segments 1106 and 1107. The glue logic does not change anything and is present typically for compatibility purposes, but it may have other purposes required by the design. The glue logic is not part of the claimed technology unless its presence is necessary to provide compatibility for the data and control signals transmitted from one Generic Interface to another. In the embodiment of FIG. 11, only an outer loop data path is shown, and the inner loop used for management transmissions is omitted. The outer loop transmit data path is shown at 1104 and the glue logic in it is shown at 1106. The outer loop receive data path is shown at 1105 and the glue logic in this receive data path is shown at 1107. The inner loop data path is omitted since the advantages of the claimed technology can be achieved without the presence of an inner loop for management transmissions and the outer loop data path will operate full duplex without any problems. In other words, an inner loop management transmission data path is not necessary for full duplex data transmissions. The claimed technology may hereafter be referred to as a Multi-Media Full Duplex Packet Data Network Splitter. The Multi-Media Full Duplex Packet Data Network Splitter is shown in the embodiment of FIG. 11 without the Management or inner loop data path (which is shown in the embodiment of FIG. 12). The Multi-Media Full Duplex Packet Data Network Splitter transmits data from the Generic Interface 1100 to the Generic Interface 1101 on the Outer Loop transmit data path 1104. The Multi-Media Full Duplex Packet Data Network Splitter receives data at the Generic Interface 1100 from the Generic Interface 1102 via the Outer Loop receive data path 1105. The transmit data and control signals of Generic Interface 1100 are coupled to the receive data path data and control signal inputs of Generic Interface 1101. The transmit data and control signals of Generic Interface 1102 are coupled to the receive data path data and control signal inputs of Generic Interface 1100. The system Oscillator, 1103, is coupled to and provides common clock signal for synchronization of the three Generic Interfaces operations. Again, the oscillator 1103 common clock signal sets the frequency of the data strobe signals on the transmit and receive outer loop data paths 1104 and 1105, respectively, but those strobe signals do not have to be in synchronization with the common clock signal.

Referring now to FIG. 12, a high level block diagram of an embodiment of the claimed technology is shown with glue logic inserted in the outer loop transmit data path 1204, the outer loop receive data path 1206 and the inner loop management transmission data path 1205. The presence of the glue logic 1207 and 1209 and 1208 does not change anything and is present typically for compatibility purposes, but it may have other purposes required by the design. The glue logic is not part of the claimed technology unless its presence is necessary to provide compatibility for the data and control signals transmitted from one Generic Interface to another.

In the embodiment of FIG. 12, an outer loop transmit data path is shown at 1204, and there is also shown an inner loop 1205 used for management transmissions to devices not shown coupled to one or more of Generic Interfaces 1200, 1201 and 1202. One segment of the outer loop transmit data path is shown at 1204. One segment of the outer loop receive data path is shown at 1206. The inner loop data path 1205 is not omitted in this embodiment despite the fact that the advantages of the claimed technology can be achieved without the presence of an inner loop for management transmissions and the outer loop data path will operate full duplex without any problems without management. In other words, an inner loop management transmission data path is not necessary for full duplex data transmissions. The claimed technology of FIG. 12 may hereafter be referred to as a Multi-Media Full Duplex Packet Data Network Splitter With Management. The Multi-Media Full Duplex Packet Data Network Splitter With Management is shown in the embodiment of FIG. 12 with the Management or inner loop data path at 1205. The Multi-Media Full Duplex Packet Data Network Splitter With Management transmits data from the Generic Interface 1200 to the Generic Interface 1201 on the Outer Loop data path 1204. The Multi-Media Full Duplex Packet Data Network Splitter With Management receives data at the Generic Interface 1200 from the Generic Interface 1202 via the Outer Loop data path 1206. The transmit data and control signals of Generic Interface 1200 are coupled to the receive data path data and control signal inputs of Generic Interface 1201. The transmit data and control signals of Generic Interface 1202 are coupled to the receive data path data and control signal inputs of Generic Interface 1200. The system Oscillator, 1203, is coupled to and provides common clock signal for synchronization of the three Generic Interfaces operations. Again, the oscillator 1203 common clock signal sets the frequency of the data strobe signals on the transmit and receive outer loop data paths 1204 and 1205, respectively, but those strobe signals do not have to be in synchronization with the common clock signal.

FIG. 13 is a block diagram of one embodiment within the genus of the invention of an Ethernet radio bridge which solves the loop problem and which does not require either a managed hub or commercial level router to solve this problem. The idea of all the embodiments disclosed herein is to send payload data packets from one packet network to another over a radio frequency bridge without suffering from the loop problem and to allow each radio transceiver to be managed from anywhere by using an inner loop for management packets. Payload data packets are any type of Ethernet packet that has been originated on one of the packet switched networks coupled to a radio bridge which is to be sent to a device on another packet switched network coupled to another radio bridge which is linked to the first radio bridge by an RF link. Management packets are defined for purposes of this specification as either broadcast packets where the first 6 bytes of the destination MAC address are all hex F's or unicast packets which have a destination MAC address which belongs to one of the circuits in the transceivers of the radio bridges. Multicast packets also exist which are supersets of broadcast packet, but they are not relevant to the invention.

In FIG. 13, at end #1, any conventional Ethernet network element such as a hub, switch, router or computer 1040 has an RJ45 Ethernet port 1042 at which Ethernet packets are both sent and received. Every Ethernet RJ45 port and it mating connector has four wires, two for transmit and two for receive. The two transmit wires are represented by line 1044. The two receive wires are represented by line 1046.

The transmit wires 1044 are connected to the receive wires of an Ethernet port 1048 of a half duplex radio transceiver 1050 at end #1. This radio transceiver converts the digital data of the Ethernet packets into a radio frequency signal 1052 which is transmitted to another half duplex radio transceiver at end #2. Transceiver 1054 demodulates the RF carrier signal, recovers the data and packetizes it in Ethernet packets, and outputs the recovered Ethernet packets from the two transmit wires 1056 of an RJ45 Ethernet port 1058. The two transmit wires 1056 of RJ45 port 1058 at end #2 are coupled to the two receive wires of Ethernet port 1060 of any Ethernet component 1061. This Ethernet component can be any switch, router, hub, computer, etc. and has no special requirements like Ethernet component 1040 at end #1 has no special requirements. The Ethernet packets received via port 1060 are processed normal. If any of the packets are broadcast packets, they are broadcast out all other Ethernet ports of the device 1061 but not out port 1060 because, by definition, no Ethernet component transmits a broadcast packet back out the same port upon which it was received.

Upstream packets to be sent from end #2 to end #1 are output on two transmit wires 1062 from port 1060 and are received at Ethernet port 1064 of a half duplex radio transceiver 1066. There, they are converted to RF signals 1068 and transmitted to a half duplex radio transceiver 1070 where the data is recovered, packetized and output on transmit wires 1046 of Ethernet port 1072. The transmit wires 1046 are coupled to the receive wires of Ethernet port 1042 and the Ethernet packets are processed normally by Ethernet component 1040. Again, if any of the packets is a broadcast packet, the Ethernet component 1040 will broadcast them out its other Ethernet ports, but not port 1042 thereby solving the looping problem.

The structure shown in FIG. 13 even without the local loops 1074 and 1076 which will be explained more below solves the looping problem even if the devices 1040 and 1061 are not Ethernet devices but had a broadcast packet and characteristic like Ethernet where broadcast packets received at one port of a switch, router or hub are broadcast out all the other ports. What solves the looping problem is the connection of one half duplex radio bridge 1050 to the two transmit wires of port 1042 and the other half duplex radio bridge 1070 to the two receive wires of the port 1042. This is true regardless of whether port 1042 is an Ethernet port or some other type of port. The structure of FIG. 13 solves the problem of enabling full duplex communication using two radio bridges even without the local loops 1074 and 1076 even in other protocols such as RS232 because the transmit wires and the receive wires of a single port are connected to two independently operating half duplex radio bridges.

The local loop connections 1074 and 1076 are necessary in Ethernet applications of the invention to enable the negotiation process to operate properly. In Ethernet, when two Ethernet devices are coupled together, the devices start a negotiation to determine what each device is capable of and what the parameters of the Ethernet link will be. The radio board network connection 1044 is an Unshielded Twisted Pair UTP. This pair is used to communicate with the Ethernet network connection at port 1042. Using this UTP connection, the two devices 1040 and 1050, perform a negotiation to agree on the maximum data rate and operational mode, e.g. 10 Mb half duplex, 100 Mb full duplex, etc. The Ethernet 10baseT or 100BaseT, 1000BaseT etc. standard requires that both ends be connected to perform an autonegotiation and agree to a link negotiation result before any data is transferred between the devices. If the negotiation does not occur, the link between the two devices is not established, and no data can be transferred.

Autonegotiation formerly NWay is an Ethernet procedure by which two connected devices choose common transmission parameters, such as speed and duplex mode. In this process, the connected devices first share their capabilities as for these parameters and then choose the fastest transmission mode they both support.

In the OSI model, autonegotiation resides in the physical layer. It was originally defined in the IEEE standard 802.3u in 1995. It was placed in the fast Ethernet part of the standard but is also backwards compatible to 10BASE-T. However, its implementation was optional, and a part of the specification was open to interpretation. The debatable portions of the autonegotiation specifications were eliminated by the 1998 version of IEEE 802.3. In 1999, the negotiation protocol was significantly extended by IEEE 802.3ab, which specified the protocol for Gigabit Ethernet, making autonegotiation mandatory for Gigabit Ethernet operation.

Autonegotiation can be used by devices that are capable of different transmission rates such as 10 Mbit/s and 100 Mbit/s, different duplex modes half duplex and full duplex and/or different standards at the same speed though in practice only one standard at each speed is widely supported. Every device starts the negotiation by declaring its technology abilities, that is, its possible modes of operation. The two devices then choose the best possible mode of operation that are shared by the two devices, where higher speed 100 Mbit/s is preferred over lower speed 10 Mbit/s, and full duplex is preferred over half duplex at the same speed.

Parallel detection is used when a device that is capable of autonegotiation is connected to one that is not such as 10BaseT. This happens if the other device does not support autonegotiation or autonegotiation is disabled via software. In this condition, the device that is capable of autonegotiation can determine the speed of the other device, and choose for itself the same speed. This procedure cannot determine the presence of full duplex, so half duplex is always assumed.

The radio boards shown in FIG. 13 are capable of autonegotiation and it is required for the embodiments disclosed herein that the devices to which the radio boards are connected also be capable of autonegotiation. Autonegotiation is required by all embodiments within the teachings of the invention because the least common denominator standard for 10BaseT devices not capable of autonegotiation is only half duplex and this defeats the purpose of the invention to implement full duplex.

The standard for 1000BASE-TX requires autonegotiation to be always present and enabled. Other than speed and duplex mode, autonegotiation is used to communicate the port type single port or multiport and the master-slave parameters whether it is manually configured or not, whether the device is master or slave if this is the case, and the master-slave seed bit otherwise.

A sequence of normal link pulses, used by 10BASE-T devices to establish link integrity. FIG. 14 shows a sequence of normal link pulses, used by 10BaseT devices to establish link integrity.

Autonegotiation is based on pulses similar to those used by 10BASE-T devices to detect the presence of a connection to another device. These pulses are sent by a device when it is not sending or receiving any data. They are unipolar positive-only electrical pulses of a duration of 100 ns, generated at intervals of 16 ms with a tolerance of 8 ms. These pulses were called link integrity test LIT pulses in the 10BASE-T terminology, and are referred to as normal link pulses NLP in the autonegotiation specification.

A device detects the failure of the link which can be due either to a failure of the transmission medium or of the other device if neither a packet nor one of the pulses are received for 50-150 ms. The presence of a valid link is signaled by the receipt of a valid packet or two consecutive link integrity test pulses. For this to work, devices send link integrity test pulses even when not receiving any.

Three trains of fast link pulses, used by autonegotiating devices to declare their capabilities. FIG. 15 shows and example of three trains of fast link pulses used by an autonegotiating device to declare its capabilities. These pulses used as part of the autonegotiating process are still unipolar, positive-only, and of the duration of 100 ns, but each one is replaced by a train of at most 33 pulses. Each such train is called a fast link pulse FLP burst. The time interval between the start of each burst is the same as the distance between normal link pulses, that is, 16 ms with a tolerance of 8 ms.

The fast link pulse burst is made as follows: there are 17 pulses at distance 125 microseconds with tolerance of 14 microseconds. In the middle between each set of two consecutive pulses, another pulse may or may not be present. The presence of a pulse represents a logical 1, the absence a logical 0. As a result, every burst represents a logical word of 16 bits. This word is called a link code word LCW. The 17 pulses are always present and are used as a clock, while the 16 pulses may or may not be present and represent the actual information that is transmitted.

Every fast link pulse burst transmits a word of 16 bits known as a link code word. The first such word is known as a base link code word, and its bits are used as follows:
- 0-4: selector field: it indicates which standard is used between IEEE 802.3 and IEEE 802.9;
- 5-12: technology ability field: this is a sequence of bits that encode the possible modes of operations among the 100BASE-T and 10BASE-T modes;
- 13: remote fault: this is set to one when the device is detecting a link failure;
- 14: acknowledgment: the device sets this to one to indicate the correct reception of the base link code word from the other party; this is detected by the reception of at least three identical base code words;
- 15: next page: this bit is used to indicate the intention of sending other link code words after the base link code word;

The technology ability field is composed of eight bits. For IEEE 802.3, these are as follows:
- bit 0: device supports 10BASE-T
- bit 1: device supports 10BASE-T in full duplex
- bit 2: device supports 100BASE-TX
- bit 3: device supports 100BASE-TX in full duplex
- bit 4: device supports 100BASE-T4
- bit 5: pause
- bit 6: asymmetric pause for full duplex
- bit 7: reserved The acknowledgement bit is used to signal the correct reception of the base code word. This corresponds to having received three identical copies of the base code word. Upon receiving these three identical copies, the device sends a link code word with the acknowledge bit set to one from six times to eight times.

The link code words are also called pages. The base link code word is therefore called a base page. The next page bit of the base page is 1 when the device intends to send other pages, which can be used to communicate other abilities. These additional pages are sent only if both devices have sent base pages with a next page bit set to 1. The additional pages are still encoded as link code words using 17 clock pulses and up to 16 bit pulses.

The problem with the connection setup in FIG. 13 absent the local loop is that the radio board 1050 only receives base code words from device 1040 but has no path to send link code words back to device 1040 with the acknowledgment bit set. Neither device 1040 nor device 1050 will light its link light until the negotiation is successfully performed by reception of a base code word successfully three times and transmission of a link code word with the acknowledge bit set. Likewise, radio board 1070 can send base code words to device 1040, but cannot receive link code words directly from device 1040. Some way to allow each of radio boards 1050 and 1070 and device 1040 to both receive base code words and transmit link code words in order to successfully complete a negotiation and establish links on data paths 1044 and 1046.

To guarantee that this negotiation is performed and completes successfully, and a way to connect the transmit data and the receive data to two different UTP connections of the radio bridge devices, a new connection method was invented. The new device and network structure allows three UTP connection devices to all successfully carry out the autonegotiation even though none of the three devices can both send base code words and receive link code words from any one of the other devices. Specifically, the new device and connection topology allows each of the radio boards 1050 and 1070 to successfully autonegotiate with device 1040 even though neither radio board 1050 or 1070 can both send base code words to and receive link code words from the device 1040.

The three UTP connections at end #1 Ethernet ports are the network device 1040 and each of the two radio bridge boards 1050 and 1070. A similar structure exists at end #2. By connecting the UTP1-tx to UTP2-rx two wire data path 1044, UTP2-tx to UTP3-rx two wire data path 1074, and UTP1-rx to UTP3-tx two wire data path 1046, the necessary negotiation between the three devices is successful, allowing data to be sent in a ring between the devices.

To understand this, refer to FIG. 17 which is a diagram of how the three devices 1040, 1050 and 1070 send base code words and link code words to each other in a ring topology. Each device sends a base code word and gets a link code word and, as far as it is concerned, the negotiation is complete even though the link code word did not come from the device to which the base code word was sent. Specifically, in FIG. 17, device 1040 sends a base code word represented by line 1080 from the transmit wires of its port 1042 at time 1. At the same time, radio board 1050 sends a base code word represented by line 1082 from the Tx wires of its port 1048 to the Rx wires of port 1072 of radio bridge 1070, and radio bridge 1070 sends a base control word line 1084 from the Tx wires of its port 1072 to the Rx wires of port 1042 of device 1040. Each device, after having received three copies of the base control word, sends a link control word at time two out its Tx wires of its respective ports. These link control words are represented by lines 1086, 1088 and 1090. These link control words have their acknowledge bits set so when they are received by the device to which they are sent, that device thinks the link control word came from the device to which the base control word was sent, and the negotiation has been successfully completed.

The result of this connection method, provides a data path from the up stream network connection to one of radio bridge boards and from the second radio board back to the up stream network connection. The 3$^{rd}$ connection between the Tx of one radio bridge board to the Rx of the other radio bridge board defined a new communications path between all the radio bridge devices, including the remote units. This new communications path is called the inner loop.

Inner Loop

The inner loop does not perform any data movement between the attached network devices. By making modifications to the existing bridging software, and the use of the inner loop, all external networking devices and other bridges, can communicate and perform configuration and management on any other radio bridge devices. With communications to any radio bridge, the network operator can configure the two radio links to function as required. This includes all available options defined in the Web management and Command Line Interpreter CLI defined by the operations manual of the prior art product made by the assignee of this invention.

In other words, the inner loop data path not only includes hardwired data paths 2206 and 212 in FIG. 18 it also includes "logical" radio links 208 and 222. In the physical world, there is only one radio frequency link between each pair of transceivers at side 1 and side 2, and this physical radio frequency link in each direction carries both payload data packets and management data packets. In other words, FIG. 18 is an illustration of the logical data paths for both the inner and outer loop between each pair of transceivers, and there is no actual separate RF link for the inner loop data path 208 or the inner loop data path 222. Between the two radio bridges, both the outer loop and the inner loop data packets are transmitted on two single RF data paths, each at a different frequency (or using different code division multiplexing for each direction at the same frequency) each carrying payload data and management data in one direction only. Each radio transceiver has a transmitter and a receiver, one of which is used to transmit or receive (but not both) payload data packets and one of which is used to transmit or receive but not both management data packets. To understand this, refer to FIG. 18. FIG. 18 illustrates both the outer loop data paths 2204 and 220 which carry Ethernet payload data packets and management data packets, and inner loop data paths 208 and 222 which carry only management data packets and broadcast data packets. Each of transceivers 2201, 2203, 2205 and 207 contains a transmitter and a receiver. The transmitter of transceiver 2201 sends both payload and management packets as RF signals to the receiver of transceiver 2205 on outer loop data path 2204. Any management packets originating at end #2 either from a device coupled to the LAN coupled to port 213 or originating from one of the transceivers 2203, 207 or 2205 and addressed to transceiver 2201 are transmitted by the transmitter of transceiver 2205 in half duplex mode back on inner loop data path 208 to transceiver 2201. The transmitter of transceiver 207 sends both payload and management data packets to transceiver 2203 via outer loop data path 220. Any management or broadcast packet originating from any device coupled to the LAN coupled to port 209 or originating at any of transceivers 2205, 2201 or 2203 and addressed to transceiver 207 are sent via the transmitter of transceiver 2203 operating in half duplex mode to transceiver 207 over inner loop data path 222.

Operations to Route Management Packets onto Inner Loop and Payload Packets onto Outer Loop In order for the various embodiments disclosed herein to work properly, it is necessary for the radio bridges to be able to distinguish payload data packets from management packets at their various inputs and route those packets properly. Each radio bridge has two ports for the outer loop payload packet data path and two ports for the inner loop management packet data path. One of each of these pairs of ports is an input and the other is an output. There is software in the radio bridges at the various ports which monitor the incoming and outgoing packets to determine what kind of packets they are, i.e., management or payload. This software routes management packets onto the inner loop and routes payload data packets onto the outer loop.

FIG. 19 is a diagram which illustrates the inner and outer loop data paths and the various software modules which make the inner loop/outer loop routing decisions. The software modules are indicated by letters and the various inner loop and outer loop data paths are indicated by reference numbers.

The details of which software modules make which routing decisions and how the various inner and outer loop data paths are used to get management packets to the various circuits they control and how data packets get where they need to go follow.

There is a need to allow complete access to each bridge device on the network, by the network system administrator. The administrator needs to send management data packets to the four radio transceivers to manage and configure and use integrated tools to control them and best optimize the performance of the network. These options are made available in each bridge as server functions using the TCP/IP protocol stack. A bridge is one pair of radio transceivers at one side of the connection and their associate DC-to-DC converter and splitter circuits. This allows for the use of TCP and UDP protocols to send management packets as Ethernet packets over the outer loop payload data path to software in the bridge which routes these packets via the inner loop to the appropriate bridge circuit at side #1 or side #2 to enable management thereof.

In FIG. 19, the data paths which existed in the prior art radio bridge circuits are shown as dotted lines. The data paths which are shown as solid lines are new paths which have been implemented in the prior art radio bridges to enable the implementation of the inner and outer loop concept and splitting the traffic of the transmit and receive pairs of an Ethernet port onto two separate half duplex radio bridges.

The management of the radio bridges requires the use of Telnet, Web Browser and SNMP and Antenna Alignment Tool server functionalities. Each of these server functionalities are software modules that exist in each radio bridge and which listen to specifically assigned port numbers of the TCP/IP protocol packets. Therefore, to invoke any one of these server functionalities to manage a radio bridge, it is only necessary to send a TCP/IP packet on the inner loop with its port number field filled with the specific port number of the tool or server functionality to be invoked.

This is new over the prior art half duplex radio bridge. In the prior art, the radio bridge was half duplex and involved two radio bridges, one on each side. Each side had one Ethernet port which was connected to one radio bridge. At any particular point in time, both radio bridges where sending in only one direction, hence the half duplex name. In other words, there was only one data path in each direction that went through both transceivers. Each radio transceiver had a transmitter and a receiver but only the transmitter on one side and the receiver on the other side would be active at any particular moment in time. In this prior art radio bridge, the Telnet, Web Browser, SNMP and Antenna Alignment Tools existed. Each tool had to monitor all packets transitioning along each path looking for packets directed to its port number, its IP address and its MAC address. There was no loop problem because the radio bridge was only coupled to one Ethernet port on each side and, by definition, when a broadcast packet entered one of those ports, it would not be sent back out the same port.

In order to make this prior art radio bridge into a full duplex radio bridge, it was necessary to add another pair of radio transceivers and then figure out how to solve the loop problem and how to get the management packets to the desired tool or tools in a selected radio transceiver. The solutions to these problems were to provide an inner loop and add new software to route management packets onto the inner loop and payload data packets onto the outer loop, and to add a splitter which allowed the use of only one Ethernet port on each side of the bridge but to segregate the transmit and receive data paths so that each data path functioned independently.

In the full duplex radio bridge embodiments disclosed herein, to allow the use of the Telnet, Web Browser, Antenna Alignment Tool, SNMP, etc. server functions and any new server functions, a need arose to redirect management TCP/IP or UDP packets onto the inner loop. This was done by making slight changes to the software of the radio bridge. These changes allow the use of the inner loop and portions of the outer loop to make sure that broadcast and unicast TCP/IP packets are properly delivered to all attached radio transceivers, thereby allowing proper server operation anywhere on the network. Whether part of the outer loop is involved in routing management packets depends upon the destination address of the management packet and where it originated.

In general, a learning bridge is a basic implementation of a transparent, layer 2 Ethernet learning bridge that learns the network topology by analyzing the source address of incoming frames from all attached networks.

The preferred embodiments disclosed herein add software modules A, B, C, D, E, F, G, H, J and K to the original circuitry and software of the radio bridge and modifies the original learning bridge code so that the learning function is disabled under certain circumstance. The original learning bridge code in the prior art radio transceivers that serve as the starting point for the embodiments disclosed herein had learning bridge code which watched the traffic passing through the bridge and modified routing tables kept by the learning bridge code to indicate on which side of each radio bridge particular MAC addresses resided. In other words, when a broadcast packet was sent out both the RF side of the bridge and the Ethernet side of the bridge, if the reply came from the Ethernet side, the routing tables of the learning bridge code would be modified to indicate that particular MAC address is on the Ethernet side of the bridge. With the addition of the inner loop and the various routing and filtering software modules detailed herein to implement the new embodiments, the learning bridge functionality can get confused under eight of the thirty different scenarios for determining the path back to the original requestor, and therefore, the occurrence of each of these eight different scenarios is watched for, and, when one occurs, the learning bridge software is disabled. The specific row numbers of Table 1 detailing these eight circumstances where the learning bridge function need to be disabled are: 9, 11, 12, 13, 15, 17, 18 and 20.

The addition of the specific above identified software modules to the prior art learning bridge is only one example of how the radio bridges can be modify to implement the inner loop concept central to all the embodiments. Other software configurations can also be used, and it only necessary to add some software functionality, regardless of configuration, which performs the following functions:

1) the ability to inspect incoming packets to determine if they are either broadcast packets or are unicast packets with destination addresses which reside in one of the radio bridge transceivers, and, if so, routing such packets onto the inner loop so that all transceivers receive them;

2) the ability to inspect packets propagating on the inner loop to determine if they are response packets, and if they are, routing these response packet onto the outer loop so they can propagate back to the original requestor;

3) the ability to filter packets to prevent looping conditions (packets cannot be sent back to the sender);

4) the ability to minimize sending of packets over the RF radio link by filtering out packets that might be destined to be transmitted over the RF but which can be removed from the RF queue without adverse affects on operations;

5) the ability to modify the prior art learning process to keep it from getting confused under certain circumstances (which can be determined from inspection of Table 1 below for the row numbers specified above—all eight of these circumstances involve situations where the input port and output are different transmissions mediums) and making improper changes to the routing tables under these circumstances.

Any radio bridge transceiver which has either hardware or software or some combination thereof which can perform the above five identified functions will suffice to practice the genus of the invention.

The changes needed to the prior art learning bridges needed to make them in accordance with the embodiment disclosed herein also allow all response packets from all attached radio transceivers to be directed back to the requestor for proper operation. These changes also allow the radio transceiver to interoperate talk to each other using the TCP/IP protocol stack, i.e., each radio transceiver tool can generate an TCP/IP packet addressed to any other port, IP address and MAC address on the network.

The primary software use of the inner loop is to make sure that any local external Ethernet packet that is destined for a radio transceiver connected to the receiving data path can receive the packets and respond back to the requestor. In the preferred embodiment, the system is designed to operate using equipment from a single vendor by requiring the first three bytes of the MAC address of any TCP/IP management packet to be a specific predetermined identifier indicating that the packet was intended to manage one of the four radio transceivers of the two radio bridges one at each end. This prevents TCP/IP management packets not having this predetermined identifier and which are not intended to manage one of the four radio transceivers from being routed onto the inner loop. The use of bridge MAC addresses, by a specific manufacturer, only prevents interoperability between vendors for managing the bridges, and is not required in all embodiments. In some embodiments, the software that makes the discrimination and routing decisions does not have this requirement. The only software restriction on the use of the inner loop for network management activities is that all attached bridge devices have the same IEEE three-octet OUI company ID used to generate unique MAC address for each Ethernet device from a specific manufacturer.

In FIG. 19, the bridge on side 1 includes radio transceivers 2201 and 2203, and the bridge on side 2 consists of radio transceivers 2205 and 207. Each of radio transceivers 2201 and 207 are identical functionally, and radio transceivers 2203 and 2205 are identical functionally. Ethernet port 209 on side 1 has its transmit pair 2200 coupled to transceiver 2201 and has its receive pair 211 coupled to transceiver 2203. At side 2, transceiver 213 has its receive pair 215 coupled to transceiver 2205 and has its transmit pair 218 coupled to transceiver 207.

The outer loop in FIG. 19 is comprised at least of data paths 2200, 2204, 210 and 215 going in one direction and 218, 220, 224 and 211 coming back in the other direction. The inner loop data path is comprised at least of data paths 2202, 2206, 226, 222, 208, 214, 212 and 216. Other data paths, software modules and the TCP/IP and learning bridge code inside the radio bridge transceivers are also involved in transporting management packets, as will be detailed in Table 1 below. Only management TCP/IP and reply TCP/IP packets flow on these inner loop data paths, and it is the responsibility of the routing software modules A and G to determine which packets are management or reply packets and route them onto the appropriate data path.

The functionality of the prior art radio bridges modified to be within the genus of new embodiments disclosed herein is detailed in the flowchart of FIG. 23. More specifically, FIG. 23, comprised of FIGS. 23A, 23B, 23C and 23D, is a flowchart of the functionality of the transceivers of the prior art radio bridges as modified by the addition of various routing and filtering functionality (which can be implemented either in hardware or software) to be within the genus of new embodiments disclosed herein. FIG. 23 is a flow diagram of the functionality implemented by the various software modules of the transceiver 2201 in FIG. 19. Incoming packets arrive from the Ethernet network port 209 arrive on data path 2200 where function 217A, (part of the software module A) determines if each incoming packet is a broadcast or a unicast packet having a predetermined number called an OUI number (manufacturer specific) as part of its destination MAC address. In the claims, routing software module A will be called a routing circuit because it is generally implemented using a suitably programmed microprocessor. The routing of packets onto data path 2202 is done solely by the routing circuit 217, but the routing of packets onto the outer loop data path 2204 is done by central circuit 282 in transceiver 2201 (similarly for routing circuit 235 in transceiver 207).

All of these incoming packets on data path 2200 are also coupled via data path 238 to circuit 282 also regardless of the processing of function 217. Each transceiver has a circuit 282 which is generally a microprocessor programmed to carry out management functions and implement a learning bridge which learns the network topology from analyzing the source and destination addresses of packets passing through the bridge. The circuit 282 will be referred to herein as the central circuit or learning bridge code from time to time. However, it is really a programmed microprocessor in most embodiments which is prior art except for one modification. In the embodiments disclosed herein, the bridge code is modified to recognize one of the eight situations identified elsewhere herein wherein the bridge code could become confused and make incorrect entries in the routing table. These situation arise from the fact that in the embodiments disclosed herein there is an inner loop, while in the prior art half duplex radio bridge transceivers there was no inner loop.

It is because there is an inner loop in the embodiments disclosed herein which makes it necessary to have a routing function to recognize selected management packets and put them on the inner loop while also recognizing payload packets and putting them on the outer loop as well as recognizing management packets which need to be sent on the outer loop to get to the transceiver to which they are addressed. This routing function is carried out in transceiver 2201 by software module A at 217 and the circuit 282. Specifically, software module A at 217 (and its counterpart software module A at 235 in transceiver 207) operates as follows to recognize certain management packets and route them onto the inner loop. If a packet arriving on path 2200 is either a broadcast or transceiver specific unicast packet, it is a management packet which needs to be routed onto the inner loop (in transceiver 207, router software A recognizes broadcast packets and transceiver specific unicast packets and puts them onto the inner loop). A "transceiver specific" unicast packet is one which has as the first three bytes (the "OUI code") of the destination MAC address a predetermined number which is manufacturer specific. In the claims, the OUI code is referred to as a "predetermined number". If those three bytes are the predetermined number it means that the packet needs to be analyzed by the central circuit (286, 276 or 280) of one of the other transceivers. In such a case, the packet is routed to function 217B where it is tagged as a management packet coming from the attached Ethernet network and is forwarded onto the inner loop data paths 2202 and 2206 where it is received by filter module F at 284 in FIG. 23B. All broadcast and unicast packets routed onto data path 2202 (or data path 216 in transceiver 207) are tagged.

FIG. 23B shows the functionality of transceiver 2203. Filter module F at 284 (referred to in the claims sometimes as a first filtering circuit because it is usually implemented as a programmed microprocessor) in transceiver 2203 determines if the incoming packet on data path 2206 originated in transceiver 2203 so that such packets can be deleted so as to prevent a looping condition that would suck up all the inner loop bandwidth. If the arriving packet did originate in bridge 2203, the packet is tagged for deletion by function 284 by setting a delete flag, but if the arriving packet did not originate in transceiver 2203, it is forwarded to software module G shown at 219A, 219B and 219C (referred to in the claims as a second filtering circuit because it is usually implemented using a programmed microprocessor) and the delete flag is not set. Function 219A receives the packet and deletes it in function 219B if the delete flag is set. Function 219C receives packets output by function 284 and determines if they were tagged by function 217A in FIG. 23A as having come from the external network. Function 219C is a gateway to the outer loop and its function is to only allow non-tagged management packets to get to the outer loop since non tagged management packets are response packets generated by a transceiver in the radio bridge which need to be routed back to the original requestor. Thus, function 219C only outputs non-tagged packets onto path 226. Since only tagged management packets and untagged response packets arrive on data path 2206, only non tagged response packets get past filter function 219C (filter G) onto path 226. Filter function J at 221 drops any tagged packets to prevent looping conditions by keeping tagged packets off data path 211 which leads back to Ethernet port 209 in FIG. 19. Tagged packets may have come from port 209 so they are not to be sent back to it to prevent looping. Filter function J is also only required in embodiments where the transceiver radio boards are purchased from an OEM who wrote their operating systems in such a way that it is possible for tagged packets to sometimes be routed by a multiplexer function in the operating system code toward path 211. If the radio transceivers were to be built "from scratch" by the inventor so that tagged packets would never get routed toward path 211 from the central circuit of transceiver 2203, filter function J at 221 would be unnecessary and that would be an alternative embodiment.

Function 219A forwards both tagged and non-tagged packets which have not been marked for deletion along data path 230 to learning bridge software process 286A. The learning bridge function 286A determines if the packet is addressed to transceiver 2203, and, if so, forwards it to learning bridge function 286B. Function 286B examines the packet addresses, updates the routing tables to reflect whatever is learned about network topography (except in one of the eight cases identified herein—see the comments below on how the learning bridge function is modified) and if the packet is a management packet addressed to transceiver 2203, whatever management function is listening to the port address in the packet header will be invoked to do whatever the management packet is requesting. The learning bridge functions 286B in FIGS. 23B and 282D in FIG. 23A and their counterparts in FIGS. 23C and 23D must be modified from their prior art states to include a function which looks for one of the eight cases where the learning bridge can get confused and disable the process of updating the routing tables. This code looks to determine upon which port of the transceiver an incoming management packet arrived and caches the source MAC address and associates the stored MAC address with the port upon which it arrived in an alternate routing table. Then that information is used each time an outgoing management packet is to be sent by intercepting the lookup to the standard routing table and diverting the lookup to the alternate routing table. The destination MAC address of the packet being built for transmission is looked up in the alternate routing table and the port associated with that destination MAC address is used to determine the routing of the outgoing packet.

Learning bridge function 286A forwards any broadcast packets (which are always deemed to be management packets) and any tagged management packets or response packets addressed to any transceiver other than 2203 to filter software modules K and H at 232A and 234A. Function 232A only passes management packets which are being sent on the inner loop from this transceiver 2203 out RF output inner loop link 222. This does not mean that they were originated by transceiver 2203. These packets may also be tagged management packets addressed to bridge 207 or response packets addressed to a device on bridge 207 which sent a management packet to some other transceiver in the radio bridge. Any packet which does not meet the filter criteria is dropped in function 232B.

The packets forwarded by function 232A are received by filter function H at 234A which functions to filter out packets having source MAC addresses in the encapsulated Ethernet packet which match the destination MAC address in the RF packet header. If they match, this indicates the packets to be sent to transceiver 207 were sourced by transceiver 207 and a possible looping condition is present. If there is a match, the packet is dropped at 25B. This also prevents unnecessary consumption of bandwidth on RF link 222.

Packets arriving at transceiver 2203 via RF outer loop data path 220 and data path 225 are received by central circuit 286B (management functions and learning bridge function) where the learning process happens to update the routing tables except in one of the eight cases identified above. If the packet is a management packet addressed to transceiver 2203, the management function listening to the port number identified in the packet is addressed and launches to do whatever management function the packet is requesting.

If the packet arriving from 286A is a payload packet, learning bridge function 286B forwards it to filter software module J at 221 where the packet is dropped if it is a tagged packet but forwarded onto data path 211 if it is not a tagged packet (only management packets arriving from the external network and addressed to one of the transceivers of the radio bridge are tagged). This is how payload data packets get across the radio bridge from Ethernet port 213 in FIG. 19 to Ethernet port 211.

Returning to the consideration of FIG. 23A, central circuit 282A receives packets on data paths 238 and determines whether this packet is a management packet addressed to transceiver 2201. If it is, the packet is forwarded to learning bridge function 282B where the learning bridge learns whatever can be learned about the network topology from the packet header information, except in one of the eight cases identified herein where the learning bridge function is disabled. That learned information is stored in routing tables kept by the learning bridge code. If the packet is a management packet addressed to transceiver 2201, whatever management functionality 282D that is listening to the port number contained in the packet header is invoked to do the requested management function, and a response management packet is generated. The routing tables in the learning bridge are consulted to determine whether the device to which the response packet is to be sent is on the RF side of the bridge or the Ethernet side. If the device to which the response packet is addressed is determined from the routing table to be on the Ethernet side of transceiver 2201, the response packet is launched on data path 236 for coupling to data path 2206 and inner loop transmission to filter function F shown at 284 in FIG. 23B. Data path 236 will carry both non tagged response packets to management packets or non tagged management packets generated in transceiver 2201 and addressed to either transceiver 2203 or 207. If the response packet is directed to a unit coupled to the RF side of the radio bridge, the response management packet is output on data path 241 to filter functions B and C shown at 243A and 243B and 245A and 245B in FIG. 23A. Filter functions 243A and 245A appear to do the same thing, and their existence in this embodiment is a function of the fact that the operating system of the radio transceiver boards was not written by the inventor but was written by the manufacturer of the prior art radio board which was modified in accordance with the teachings of the invention. The existence of filter function 245A is necessary because the filter function 243A occurs earlier in the code line of the radio transceiver, and, in some circumstances, tagged packets can attempt to be routed to the outer loop at later points in the transceiver code. Filter function 245A and 245B detects these tagged packets and drops them before they get to the outer loop.

Filter function B at 243A determines if the packet arriving on 241 is tagged as a management packet coming from an outside network and, if yes, drops it as represented by block 243B. Tagged packets are management packets that came from a connected packet network and which were routed onto the inner loop because they had a predetermined number called an OUI code in their destination MAC address. Response management packets are never tagged. Thus, the response packet generated by learning bridge code 282D is passed through filter function B to outer loop data path 2204 for transmission to transceiver 2205. However, any tagged management packet which happened to find its way onto data path 241 from function 282A would be dropped by filter function B at 243A. If the packet received by function 243A is not to be dropped, function 243A encapsulates into an outer RF packet which encapsulates the Ethernet packet. Filter function B is not necessary in all embodiments. Filter function B is only necessary in embodiments where a radio transceiver is purchased from a vendor which wrote the operating system and that operating system includes a multiplexer function which sometimes decides to send tagged packets on data path 241. If the radio boards were to be manufactured "from scratch" and all their code were to be written by the inventor, that code would never send a tagged packet on data path 241, and filter function B would not be necessary.

Filter function C at 245A also receives all the data packets travelling on data path 241 from either learning bridge 282D or function 282A and does the same things as functions 243A and 243B. The difference is that functions 243A and 243B, in this embodiment, are a failsafe to prevent transmission over the RF link of packets forwarded by the OEM operating system code of the radio which is not under control of the inventors. Any packets passing through the gauntlet of filter and routing functions described herein and arriving at data path 2204 are converted by conventional circuitry from data packets into RF signals and transmitted. Payload packets addressed to the other network will arrive on path 2200 and pass through function 282A unchecked and will pass through filter functions B and C unhindered to data path 2204 because payload data packets are never tagged.

Transceiver 2201 can also receive management data packets on inner loop RF data path 208 from transceiver 2205. These packets are recovered from the radio frequency signals by the prior art physical layer circuitry of the transceiver and output to filter function E shown at 257A. This filter function E determines if the incoming packet has a source MAC address of the Ethernet packet which was encapsulated in the RF packet to determine if the packet was sourced by transceiver 2201. If it was sourced by transceiver 2201, the packet is dropped, as represented by block 257B. If the packet is not dropped, it is forwarded to filter function D at 255A. This function 255A determines if the incoming packet is a tagged management packet coming in from an outside network which is not addressed to transceiver 2201, and, if that is the case, drops the packet in 255B. Tagged management packets addressed to transceiver 2201 will be output on path 251 to central circuit 282C which determines whether the incoming management packet is addressed to this transceiver. If it is, the packet is sent to central circuit 282D where the topology learning function happens (under predetermined circumstances), and whatever management function the packet is intended to invoke (if that is the case) is invoked. If the incoming packet is a response packet to some packet generated earlier by some function in the central circuit, it is directed to whatever management function code generated the original management packet. If the incoming management packet is from some device which is not in the routing table and is addressed to transceiver 2201, the central circuit will carry out the management function, generate a response packet and then determine from the routing table that it is not known whether the device to which the response packet is to be sent is on the RF side or the network side of the transceiver. In such a case, the central circuit will forward the response packet both toward the inner loop packet network port 2206 and the RF outer loop output port 2204. This functionality is implemented in all the central circuits of all the transceivers in both bridges when there is no entry in their routing tables for the device to which a packet is to be sent. In such cases, the central circuit route the packet out with the data path headed toward the RF side of the transceiver and the data path headed toward the network side of the transceiver.

The packets arriving at 282C are never payload data packets but they could be either response management packets addressed to bridge 2203 or 207 or management packets sourced in transceiver 2205 and addressed to either transceiver 2203 or 207. Such packets will be forwarded by 282C onto data path 236 for output on inner loop data path 2206.

FIG. 18C and FIG. 18D show the same functionality as was just described for transceivers 2203 and 2205, but for transceivers 2205 and 207. The various functional blocks and data paths have been labeled with the reference numbers of transceivers 2205 and 207 in FIG. 19, but no further explanation will be given as the functions of these routing and filter blocks are the same as their counterparts in transceivers 2201 and 2203.

The following packet flow description assumes that communication is functioning correctly over paths 2204, 208, 222 and 220. What that means is the transceiver 2205 is properly configured to talk to transceiver 2201, and transceiver 2203 is properly configured to talk to transceiver 207. Properly configured means that the frequency, bandwidth, encryption type and opposite unit's MAC address have all been set properly in the configuration data of the transceiver.

Side 1

All packets from an attached local wired network Ethernet port 209 are transmitted to transceiver 2201 on path 2200 and all packets to be transmitted to the Ethernet port 209 are transmitted from transceiver 2203 on paths 224 and 211. If the packet on 2200 is a broadcast packet for any device or is a unicast packet, the routing software A at 217 routes the packet onto both the outer loop data path 2204 (via data path 238, learning bridge code 282 and data path 241) as well as onto the local loop data path 2202 so that the broadcast and unicast packets reach radio transceivers 2201, 2203, 2205 or 207 in addition to being sent across the link on the outer data path to Ethernet port 213 (the same thing happens in the bridge on side 1). In addition, if the packet arriving on path 2200 is a broadcast or unicast packet addressed to one of the transceivers and is a management packet, then routing software A at 217 tags the management packet as coming in from the external Ethernet network. In such a case, the broadcast or unicast packet is sent to the other transceivers via data path 2202. Tagged packets are only allowed to propagate on the inner loop, and the filter software will kill such a packet if it is on a path which would take it to the outer loop. The tags assist the routing software modules to properly route inner loop packets and prevent possible inner loop infinite looping conditions.

If the packet arriving at routing software module A at 282 is not a management packet addressed to transceiver 2201, it is sent out path 2204 (via paths 238 and 241 and the bridge code of transceiver 2201) to transceiver 2205 for processing. The packets sent out outer loop data path 2204 can be payload data packets destined for a device connected to the remote Ethernet network (port 213) or they can be broadcast or unicast management packets addressed to transceiver 2205 which transceiver 2205 needs to see.

If the packet arriving on data path 2200 is a management packet addressed to transceiver 2201, software module A routes it onto paths 238 and 2202. The bridge code 282 of transceiver 2201 then processes the management packet, and generates one or more response packets. This response packet is sent out via data paths 236 and 2206 to the inner loop. The response packet is analyzed by routing software G at 219 and sent out data path 226 to the outer loop data path 211 as a packet sourced by transceiver 2201. Data path 226 terminates at a filter software module J shown at 221 which merges the response packet with data packets from data path 224 onto data path 211 where it travels back to the requestor.

Inner loop management packets propagating on path 2202 are directed onto the inner loop path 2206 for processing by the transceivers 2203 and 207. These packets on data path 2206 are inner loop packets which are always broadcast packets, unicast management packets or response packets. All these packets are TCP/IP packets, and the protocol to establish connections between devices on the inner loop is therefore the same as is used in TCP/IP protocol connects in the prior art such as on the internet.

If the packets are tagged in routing software A at 217 as having come from the external attached Ethernet network, they are routed onto data path 2206 via data path 2202 to be analyzed by routing software G at 219 in transceiver 2203. If the packets arriving on 2206 are broadcast packets, any unicast packet that are not addressed to transceiver 2203, they are routed by software module G at 219 onto inner loop data path 222 (via data paths 230, bridge code 286 and data path 249 and filter modules K and H at 232 and 234), and they are also routed onto data path 226. If the packet arriving on path 2206 is a tagged management packet which is addressed to transceiver 2203, then routing software G at 219 transmits the packet to bridge code 286 via 230. Bridge code 286 does the requested management function and generates one or more response packets which are sent out paths 224 and 211 to be returned to the requestor and are also sent out data paths 249 through filter code H and K at 232 and 234 and data path 222 to transceiver 2203 where they are routed back to the requestor coupled to Ethernet port 213 via filter code D and E at 229 and 288, data path 253, bridge code 276, data path 212, filter code F at 240, routing code G at 237, data path 214, filter code J at 239 and data path 215.

Packets coming into transceiver 2205 on outer loop data path 2204 could be either payload data packets or management packets. They are analyzed by bridge code 280 in transceiver 2205, and if the packet is not addressed to bridge 2205, it is sent out data path 210 and data path 215 to the attached Ethernet network coupled to port 213. This is how payload data packets traverse transceivers 2201 and 2205 via the outer loop to get from Ethernet port 209 to Ethernet port 213.

Any response packet from any device connected to port 213 will come back via port 213 and be placed on data path 218. If the packet on outer loop path 2204 is a management packet addressed to transceiver 2205, the requested management function is performed, and a response of one or more packets is generated by bridge code 280 in transceiver 2205 and sent out on data path 227 and inner loop data path 208 to transceiver 2201. There, the packet is filtered by new software modules D and E at 255 and 257. Filter module D only allows packets addressed to transceiver 2201 to pass and response packets from transceiver 2205 to continue on path 251. Filter software E at 257 drops any packet which was originally sent by transceiver 2201 to prevent looping. Since, in this example the packet arriving on line 208 is a response packet from transceiver 2205, it is forwarded onto data path 2206 (via code D, E, path 251, bridge code 282 and data path 236 to path 2206. The response packet in this example is analyzed by software module G at 219, and sent out path 226 for merging with packets from data path 224 and sent back to the requestor via data path 211.

Packets coming in to transceiver 207 on inner loop data path 222 are analyzed to determine if they are addressed to transceiver 207. If they are not addressed to transceiver 207, the packet is dropped by filter software D at 229. If the packet is addressed to transceiver 207, the management packet is processed by bridge code 276, and one or more response packets are generated and sent out paths 223 and 220. These packets are filtered by filter software modules B and C at 231 and 233. Filter software module B at 231 drops any management packets that have been tagged as having come from the external network. Filter software module C at 233 does the same thing (for packets coming through different paths through the code). Since, in this example, the packets are response packets generated by transceiver 207, they are forwarded by filter software B and C to transceiver 2203 via data path 225, bridge code 286, and data paths 224 and 211 for transmission back to the requestor.

Side 2

All packets from an attached local wired network Ethernet port 213 are transmitted to transceiver 207 on path 218 and all packets to be transmitted to the Ethernet port 213 are transmitted from transceiver 2205 on paths 210 and 215. If the packet on 218 is a broadcast packet for any device or is a unicast packet, the routing software A at 235 routes the packet onto both the outer loop data path 220 (via data paths 274 and 223 as well as onto the local loop data path 216 so that the broadcast and unicast packets reach radio transceivers 2201, 2203, 2205 or 207 in addition to being sent across the link on the outer data path to Ethernet port 209 (the same thing happens in the bridge on side 1). In addition, if the packet arriving on path 218 is a broadcast or unicast packet addressed to one of the transceivers and is a management packet, then routing software A at 235 tags the management packet as coming in from the external Ethernet network. In such a case, the broadcast or unicast packet is sent to the other transceivers via data path 216. Tagged packets are only allowed to propagate on the inner loop, and the filter software will kill such a packet if it is on a path which would take it to the outer loop. The tags assist the routing software modules to properly route inner loop packets and prevent possible inner loop infinite looping conditions.

If the packet arriving at routing software module A at 235 is not a management packet addressed to transceiver 207, it is sent out path 220 (via paths 274 and 223 and the bridge code of transceiver 207) to transceiver 2203 for processing. The packets sent out outer loop data path 220 can be payload data packets destined for a device connected to the remote Ethernet network (port 209) or they can be broadcast or unicast management packets addressed to transceiver 2203 which transceiver 2203 needs to see.

If the packet arriving on data path 218 is a management packet addressed to transceiver 207, software module A routes it onto paths 274 and 216. The bridge code 276 of transceiver 207 then processes the management packet, and generates one or more response packets. This response packet is sent out via data paths 278 and 212 to the inner loop. The response packet is analyzed by routing software G at 237 and sent out data path 214 to the outer loop data path 215 as a packet sourced by transceiver 207. Data path 214 terminates at a filter software module J shown at 239 which merges the response packet with data packets from data path 210 onto data path 215 where it travels back to the requestor.

Inner loop management packets propagating on path 216 are directed onto the inner loop path 212 for processing by the transceivers 2205 and 2201. These packets on data path 212 are inner loop packets which are always broadcast packets, unicast management packets or response packets. All these packets are TCP/IP packets, and the protocol to establish connections between devices on the inner loop is therefore the same as is used in TCP/IP protocol connects in the prior art such as on the internet.

If the packets are tagged in routing software A at 235 as having come from the external attached Ethernet network, they are routed onto data path 212 via data path 216 to be analyzed by routing software G at 237 in transceiver 2205. If the packets arriving on 212 are broadcast packets, any unicast packet that are not addressed to transceiver 2205, they are routed by software module G at 237 onto inner loop data path 208 (via data paths 228, bridge code 280 and data path 227 and filter modules K and H at 272 and 270), and they are also routed onto data path 214. If the packet arriving on path 212 is a tagged management packet which is addressed to transceiver 2205, then routing software G at 237 transmits the packet to bridge code 280 via 228. Bridge code 280 does the requested management function and generates one or more response packets which are sent out paths 210 and 215 to be returned to the requestor and are also sent out data paths 227 through filter code H and K at 272 and 270 and data path 208 to transceiver 2205 where they are routed back to the requestor coupled to Ethernet port 209 via filter code D and E at 255 and 257, data path 251, bridge code 282, data path 2206, filter code F at 284, routing code G at 219, data path 226, filter code J at 221 and data path 211.

Packets coming into transceiver 2203 on outer loop data path 220 could be either payload data packets or management packets. They are analyzed by bridge code 286 in transceiver 2203, and if the packet is not addressed to bridge 2203, it is sent out data path 224 and data path 211 to the attached Ethernet network coupled to port 209. This is how payload data packets traverse transceivers 207 and 2203 via the outer loop to get from Ethernet port 213 to Ethernet port 209.

Any response packet from any device connected to port 209 will come back via port 209 and be placed on data path 2200. If the packet on outer loop path 220 is a management packet addressed to transceiver 2203, the requested management function is performed, and a response of one or more packets is generated by bridge code 286 in transceiver 2203 and sent out on data path 249 and inner loop data path 222 to transceiver 207. There, the packet is filtered by new software modules D and E at 229 and 288. Filter module D only allows packets addressed to transceiver 207 to pass and response packets from transceiver 2203 to continue on path 253. Filter software E at 288 drops any packet which was originally sent by transceiver 207 to prevent looping. Since, in this example the packet arriving on line 222 is a response packet from transceiver 2203, it is forwarded onto data path 212 (via code D, E, path 253, bridge code 276 and data path 278 to path 212. The response packet in this example is analyzed by software module G at 237, and sent out path 214 for merging with packets from data path 210 and sent back to the requestor via data path 215.

Packets coming in to transceiver 2201 on inner loop data path 208 are analyzed to determine if they are addressed to transceiver 2201. If they are not addressed to transceiver 2201, the packet is dropped by filter software D at 255. If the packet is addressed to transceiver 2201, the management packet is processed by bridge code 282, and one or more response packets are generated and sent out paths 241 and 2204. These packets are filtered by filter software modules B and C at 243 and 245. Filter software module B at 243 drops any management packets that have been tagged as having come from the external network. Filter software module C at 245 does the same thing (for packets coming through different paths through the code). Since, in this example, the packets are response packets generated by transceiver 2201, they are forwarded by filter software B and C to transceiver 2205 via data path 247, bridge code 280, and data paths 210 and 215 for transmission back to the requestor.

Table 1 below documents all the possible payload data packet paths and all the possible management data packet paths and details the data path numbers that each type packet propagates upon for each scenario. Each row in the table is one scenario.

TABLE 1

| | | Data Paths | | |
|---|---|---|---|---|
| Packet Source | Packet Destination | Request Paths | Response Paths | Extra Path And Remarks |
| Ethernet Port 209 | Transceiver 2201 | 2200, 217, 238 | 236, 2206, 284, 219, 226, 221, 211 | 217, 2202, 2206, 284, 219, 230, 286, 249, 232, 234, 222, 288 where it is stopped by filter action. The request path, response path and extra paths are graphically illustrated in FIG. 20. |
| Ethernet Port 209 | Transceiver 2203 | 2200, 217, 2202, 2206, 284, 219, 230, 286 | 224, 221, 211 | 217, 238, 282, 241, 243, 245, 2204, 247, 280, 210, 239, 215 and out 213. FIG. 21 illustrates the request path and the response path and extra paths. |
| Ethernet Port 209 | Transceiver 2205 | 2200, 217, 238, 282, 241, 243, 245, 2204, 247 | 227, 272, 270, 208, 257, 255, 251, 282, 236, 2206, 284, 219, 226, 221, 211 | 217, 2202, 2206, 284, 219, 230, 286, 249, 232, 234, 222, 288 |
| Ethernet Port 209 | Transceiver 207 | 2200, 217, 2202, 2206, 284, 219, 230, 286, 249, 232, 234, 222, 288, 229, 253 | 223, 231, 233, 220, 225, 286, 224, 221, 211 | 217, 238, 282, 241, 243, 245, 2204, 247, 280, 210, 239, 215 |
| Ethernet Port 213 | Transceiver 207 | 218, 235, 274 | 278, 212, 240, 237, 214, 239, 215 | 235, 216, 212, 240, 237, 228, 280, 227, 272, 270, 208, 257 |
| Ethernet Port 213 | Transceiver 2205 | 218, 235, 216, 212, 240, 237, 228 | 210, 239, 215 | 235, 274, 276, 223, 231, 233, 220, 225, 286, 224, 211 |
| Ethernet Port 213 | Transceiver 2203 | 218, 235, 274, 276, 223, 231, 233, 220, 225 | 249, 232, 234, 222, 288, 229, 253, 276, 278, 212, 240, 237, 214, 239, 215 | 235, 216, 212, 240, 237, 228, 280, 227, 272, 270, 208, 257 |

TABLE 1-continued

Data Paths

| Packet Source | Packet Destination | Request Paths | Response Paths | Extra Path And Remarks |
|---|---|---|---|---|
| Ethernet Port 213 | Transceiver 2201 | 218, 235, 216, 212, 240, 237, 228, 280, 227, 272, 270, 208, 257, 255, 251 | 241, 243, 245, 2204, 247, 280, 210, 239, 215 | 235, 274, 276, 223, 231, 233, 220, 225, 286, 224, 211 |
| Transceiver 2201 | Transceiver 2203 | 236, 2206, 284, 219, 230 | 249, 232, 234, 222, 288, 229, 253, 276, 278, 212, 240, 237, 228, 280, 227, 272, 270, 208, 257, 255, 251 | 219, 226, 221, 211 & 237, 214, 239, 215 |
| Transceiver 2201 | Transceiver 2205 | 241, 243, 245, 2204, 247 | 227, 272, 270, 208, 257, 255, 251 | none |
| Transceiver 2201 | Transceiver 207 | 236, 2206, 284, 219, 230, 286, 249, 232, 234, 222, 288, 229, 253 | 278, 212, 240, 237, 228, 280, 227, 272, 270, 208, 257, 255, 251 | 219, 226, 221, 211 & 237, 214, 239, 215 |
| Transceiver 2203 | Transceiver 2201 | 249, 232, 234, 222, 288, 229, 253, 276, 278, 212, 240, 237, 228, 280, 227, 272, 270, 208, 257, 255, 251 | 236, 2206, 284, 219, 230 | 219, 226, 221, 211 & 237, 214, 239, 215 |
| Transceiver 2203 | Transceiver 2205 | 249, 232, 234, 222, 288, 229, 253, 276, 278, 212, 240, 237, 228 | 227, 272, 270, 208, 257, 255, 251, 282, 236, 2206, 284, 219, 230 | 219, 226, 221, 211 & 237, 214, 239, 215 |
| Transceiver 2203 | Transceiver 207 | 249, 232, 234, 222, 288, 229, 253 | 223, 231, 233, 220, 225 | none |
| Transceiver 207 | Transceiver 2201 | 278, 212, 240, 237, 228, 280, 227, 272, 270, 208, 257, 255, 251 | 236, 2206, 284, 219, 230, 286, 232, 234, 222, 288, 229, 253 | 219, 226, 221, 211 & 237, 214, 239, 215 |
| Transceiver 207 | Transceiver 2203 | 223, 231, 233, 220, 225 | 249, 232, 234, 222, 288, 229, 253 | none |
| Transceiver 207 | Transceiver 2205 | 278, 212, 240, 237, 228 | 227, 272, 270, 208, 257, 255, 251, 282, 236, 2206, 284, 219, 230, 286, 249, 232, 234, 222, 288, 229, 253 | 219, 226, 221, 211 & 237, 214, 239, 215 |
| Transceiver 2205 | Transceiver 207 | 227, 272, 270, 208, 257, 255, 251, 282, 236, 2206, 284, 219, 230, 286, 249, 232, 234, 222, 288, 229, 253 | 278, 212, 240, 237, 228 | 219, 226, 221, 211 & 237, 214, 239, 215 |
| Transceiver 2205 | Transceiver 2201 | 227, 272, 270, 208, 257, 255, 251 | 241, 243, 245, 2204, 247 | none |
| Transceiver 2205 | Transceiver 2203 | 227, 272, 270, 208, 257, 255, 251, 282, 236, 2206, 284, 219, 230 | 249, 232,234, 222, 288, 229, 253, 276, 278, 212, 240, 237, 228 | 219, 226, 221, 211 & 237, 214, 239, 215 |
| Ethernet Port 209 | Ethernet Port 213 | 2200, 217, 238, 282, 241, 243, 245, 2204, 247, 280, 210, 239, 215 | 218, 235, 274, 276, 223, 231, 233, 220, 225, 286, 224, 221, 211 | none |
| Ethernet Port 213 | Ethernet Port 209 | 218, 235, 274, 276, 223, 231, 233, 220, 225, 286, 224, 221, 211 | 2200, 217, 238, 282, 241, 243, 245, 2204, 247, 280, 210, 239, 215 | none |

TABLE 1-continued

Data Paths

| Packet Source | Packet Destination | Request Paths | Response Paths | Extra Path And Remarks |
|---|---|---|---|---|
| Transceiver 2201 | Ethernet Port 209 | 236, 2206, 284, 219, 226, 221, 211 | 2200, 217, 238 | 219, 230, 286, 249, 232, 234, 222, 288 |
| Transceiver 2203 | Ethernet Port 209 | 224, 221, 211 | 2200, 217, 2202, 2206, 284, 219, 230 | 217, 238, 282, 241, 253, 245, 2204, 247, 280, 210, 239, 215 |
| Transceiver 2205 | Ethernet Port 209 | 227, 272, 270, 208, 257, 255, 251, 282, 236, 2206, 284, 219, 226, 221, 211 | 2200, 217, 238, 282, 241, 243, 245, 2204, 247 | 219, 230, 286, 249, 232, 234, 222, 288 |
| Transceiver 207 | Ethernet Port 209 | 223, 231, 233, 220, 225, 286, 224, 221, 211 | 2200, 217, 2202, 2206, 284, 219, 230, 286, 249, 232, 234, 222, 288, 229, 253 | 217, 238, 282, 241, 243, 245, 2204, 247, 280, 210, 239, 215 |
| Transceiver 2201 | Ethernet Port 213 | 241, 243, 245, 2204, 247, 280, 210, 239, 215 | 218, 235, 216, 212, 240, 237, 228, 280, 227, 272, 270, 208, 257, 255, 251 | 235, 274, 276, 223, 231, 233, 220, 225, 286, 224, 211 |
| Transceiver 2203 | Ethernet Port 213 | 249, 232, 234, 222, 288, 229, 253, 276, 278, 212, 240, 237, 214, 239, 215 | 218, 235, 274, 276, 223, 231, 233, 220, 225 | 237, 228, 227, 272, 270, 208, 257 |
| Transceiver 2205 | Ethernet Port 213 | 210, 239, 215 | 218, 235, 216, 212, 240, 237, 228 | 235, 274, 276, 223, 231, 233, 220, 225, 286, 224, 211 |
| Transceiver 207 | Ethernet Port 213 | 278, 212, 240, 237, 214, 239, 215 | 218, 235, 274 | 237, 228, 280, 227, 272, 270, 208, 257 |

Features of various embodiments disclosed herein are as follows:
1) The size of the full duplex radio bridge is much less than a AC powered router coupled to a hardwired local area network.
2) The full duplex radio bridge appears to the other network elements to be one network device so looping cannot occur.
3. Having all the payload data going from side one to side two transmitted simultaneously with all the payload data going from side two to side 1 because of full duplex operation, causes a 50% improvement in throughput because the radio bridge does not have to switch from transmit to receive.
4. The radio bridge structure allows management packets to be transmitted to individual transceivers so that each radio bridge path going in each direction can be separately configured. This allows asymmetric network design for high speed downloads and lower speed uploads and saves spectrum because the upstream and downstream do not need to consume the same amount of bandwidth.
5. Management access is provided to each of the four transceivers in the radio bridge so each can be separately configured and managed.
6. The implementation allows the system to be completely functional in multipoint system architectures. This means that any single bridge can be configured to communicate with multiple other devices using the same two RF data paths (one upstream and one downstream). FIG. 22 is a diagram of a multipoint architecture. Ethernet network 3300 is coupled to full duplex bridge 302 via a single Ethernet port 213. The full duplex bridge 302 is the equipment illustrated on side 2 of FIG. 21. The full duplex bridge 302 can be simultaneously coupled via the same two RF data paths and antenna 304 to the antennas 306, 308, 310 and 312 of full duplex bridges A, B, C and D. Each of these full duplex bridges is coupled via a single Ethernet port to Ethernet networks 314, 316, 318 and 320. Each of the devices on those networks 314, 316, 318 and 320 can exchange packets with any of the devices on network 3300 via the five full duplex radio bridges of FIG. 19 as long as the antennas of the full duplex radio bridges are within line of sight communication with antenna 304. The practical limit is 124 full duplex bridges. In other words, no full bridge can talk to more than 124 full duplex bridges at any particular time.

The claimed technology is optimized for three network connections to prevent any store-and-forward latency from occurring. More than three ring type connections can be made, but the functionality of any three adjoining Network Connect devices, function as described in the embodiments disclosed herein. When four or more Network Connect devices are made, latency will occur when moving the data to the four or more devices. The latency will continue to increase in proportion to the number of Network Connection above three that are being used. Any device used between any two Network Connecting devices is considered glue logic, for bridging from one variant of the MII bus to another.

In the claims, the term "data path" includes actual conductive traces or logical data paths through PHY and/or MAC bus interfaces and/or glue logic and can comprise both data transmission lines as well as control signals such as clock or error or status signals necessary for transmission of payload data on the data lines of the data path.

The following drawings show how the application at bar fits into the technology of the prior splitter. The splitting of the MII bus in FIG. 24 occurs in the circuit board that is outlined in dashes (this corresponds to FIG. 10). The circuit board is comprised of chips manufactured by others. In this circuit board, integrated circuit 1000 is the circuit that does the negotiation between the physical layer Ethernet port and the MII bus. It does the negotiation as shown in FIGS. 14, 15 and 16 in a conventional manner. The PHY layer of circuit 1000 where this negotiation happens on the left side of the chip. Then, after the negotiation is finished, the data for transmission and reception on the MII bus is presented in the signals on the right side of the chip.

Each PHY chip 1000, 1001 and 1002 sends data out the Tx MII bus signals to a different PHY chip than it receives data from. These isolated MII bus paths provide direct communications between the Network Connection 1040 (end #1), Radio Board 1050 and Radio Board 1070. The first data path consists of a data movement of end #1 1040 to chip 1000 over MII bus path 1004 to chip 1001 to Radio Board 1050. The second data path consists of a data movement Radio Board 1050 to chip 1001, out from chip 1001 over data path 1005 to chip 1002 and from there to Radio Board 1070. The third data path consists of data movement from Radio Board 1070 to chip 1002 over data path 1006 and from there to chip 1000 and to Network Connection 1040 (end #1).

The MII bus 1004 transfers data from PHY chip 1000 to PHY chip 1001. The MII bus 1006 transfers data from PHY chip 1002 to PHY chip 1000. Both of these paths are known as part of the Outer Loop. MII bus 1005 transfers management packet data from PHY chip 1001 to PHY chip 1002, and is known as part the Inner Loop. The two paths identified as Outer Loop, are independent paths which never transfer the same packets.

This completes a ring topology at the MII bus level in layer 2. The generic PHY chip 1000, generic PHY chip 1001 and generic chip 1002 can be designed for interface between an MII bus and an unshielded twisted pair Cat 5 Ethernet cable. But other PHY chips can be chosen which can interface between MII bus and fiber optic cable or copper wire or whatever future media is used. Using different media types for either the END #1 Network Connection or future Radio board types could require different MII Bus interface requirements for the selected media types. In FIG. 11 and FIG. 12, Glue Logic is introduced to match the MII Bus operation between different PHY's with incompatible MII Bus interfacing specifications. The Glue Logic adds the ability to enhance the MII Bus for potentially different data rates, bus widths, control, status, etc.

The technology shown in FIG. 24 can implement a ring topology between any combination the 3 PHY chips or bus variants (1000, 1001 and 1002) or three MAC chips or bus variants (FIG. 10). The concept shown in FIG. 24 is basically the ring topology of FIG. 17 (the parent patent ring topology) but implemented at the interface between the PHY and MAC layers. In the parent patent, the ring topology was implemented strictly on the PHY layer. When the technology moved to gigabit Ethernet, all eight wires were used in the bidirectional mode which frustrated the idea used in the parent patent so the new technology of implementing the ring at the interface between the PHY and MAC layers was invented.

The parent patent tricked the first, second and third PHY layer devices into thinking the negotiation was complete because they got a link control word back even though it was not from the device it sent the base control word to. In the new technology, this negotiation no longer exists. Now, in the MII bus and its variants, all devices have to be able to transmit and receive at the same speed and all that is necessary is that they operate on the same clock. All that is necessary to achieve the ring topology in the MII bus between the PHY and MAC layers is separation of the transmit and receive and control paths and the ability of the three devices to transmit and receive using the same clock.

FIG. 24 shows the new material, MII BUS Splitter, inserted into END #1 of FIG. 13 using RMII PHY chips (defined as generic MII bus chips), demonstrating a 10/100BASE-T bridge. Each wire pair, 1044, 1046, and 1074, of the parent, are cut into 2 pair segments each, resulting in 1044A and 1044B, for 1044, 1046A and 1046B, for 1046, and 1074A and 1074B, for 1074.

Segment 1044A connects 1040, via 1042, to PHY 1000, segment 1044B connects PHY 1001 to 1050, via 1048, segment 1046A connects 1070, via 1072, to PHY 1002, segment 1046B connects PHY 1000 to 1040, via 1042, segment 1074A connects 1050, via 1048, to PHY 1001, and segment 1074B connects PHY 1002 to 1070, via 1072.

The MII BUS Splitter, as described in FIG. 10, is operating the END #1 bridge and passing network data exactly the same as a parent bridge, shown on END #2. FIG. 24 also shows the interoperability between the new material and the parent.

FIG. 25 show that the PHY Layer splitting, invented in the parent, has now been removed. The resulting Link Control Word Negotiation is now operating between 1040 and PHY 1000. Radio bridge 1050 and PHY 1001, and radio bridge 1070 and PHY 1002, are operating in negotiating with the Link Control Word and functioning in a conventional manner to negotiate speed. Within the chip outlined in dashes, the speed of transmission and reception on the MII bus is the same however.

FIG. 26 shows the use of 3 RGMII PHY devices, which is gigabit Ethernet, as the MII BUS Splitter. This PHY selection provides 1000BASE-T Ethernet functionality between 1040 and PHY 1000, 1050 and PHY 1001, and 1070 and PHY 1002. This requires that clock 1003 be different depending upon the requirements of the chip. This demonstrates the use of different Physical Layer technologies by using the Layer 2, MII BUS Splitter. FIG. 26 shows the interoperability between an END #1 bridge running at 1000BASE-T network speed, while communicating with END #2 parent bridge, running at 10/100BASE-T network speed.

FIG. 27 shows FIG. 23 with the Inner Loop Connection removed. This version of the bridge passes data through the network and communicates to END #2, and its network connected devices, normally. With the Inner Loop Connection removed, access to the Radio Boards 1050 and 1070, are prevented from all the END #1 network connected devices, targeted to Board 1050 or Board 1070, not allowing management access to these 2 radio boards, and improving security of Board 1050 and Board 1070. If the Inner Loop is removed on END #2, if allowed, all 4 radio boards of the END #1 and END #2 communications path, are not accessible from any device connected to the network of END #1 or END #2. If the Inner Loop connection is removed from one bridge, of a multipoint network, FIG. 22, only the network devices connected to the bridge, without the Inner Loop, are prevented from accessing the two radio boards of the bridge, to access or perform management functions. With the removal of the physical Inner Loop connection, the software described in FIG. 23 does not have to be present on the radio boards of that bridge, allowing the bridge to pass data between the two network connections.

What is claimed is:

1. A link between two network connections including two bus splitters, comprising:
    a first PHY interface having a twisted pair or fiber optic network connection for coupling to a network device, and having Media Independent Interface bus (MII bus) output, and an MII bus input, and having a clock input;
    a second PHY interface having an MII bus input coupled to said MII bus output of said first PHY interface, and have a twisted pair or fiber optic output, and having a clock input;
    a third PHY interface having a MII bus output coupled to said MII bus input of said first PHY interface, and have a twisted pair or fiber optic input, and having a clock input;
    a fourth PHY interface having a twisted pair or fiber optic network input connection for coupling to said twisted pair or fiber optic output of said second network device and having Media Independent Interface bus (MII bus) output, and an MII bus input, and having a clock input;
    a fifth PHY interface having an MII bus input coupled to said MII bus output of said fourth PHY interface, and having a twisted pair or fiber optic network connection for coupling to the twisted pair or fiber optic input of said third PHY interface, and having a clock input; and
    a sixth PHY interface having an MII bus input coupled to said MII bus output of said fourth PHY interface, and having a twisted pair or fiber optic output coupled to said twisted pair or fiber optic input of said second PHY interface and having a clock input, and
    a clock coupled to supply a clock signal to said clock inputs of all PHY interfaces of single splitter, all PHY interfaces transmitting data using said same clock rate of each splitter.

2. An MII BUS device splitter comprising:
    a printed circuit board base;
    a first MII BUS device mounted on said printed circuit board that converts incoming Layer 1 signals, for PHY, or MAC packet data, for MAC, and transmits out Layer 2 MII BUS signals;
    a second MII BUS device mounted on said printed circuit board that receives Layer 2 MII BUS signals from the first MII BUS device, and transmits out second MII BUS device layer 1 signals, for PHY, or MAC packet data, for MAC;
    a third MII BUS device mounted on said printed circuit board that converts incoming Layer 1 signals, for PHY, or MAC packet data, for MAC, and transmits out Layer 2 MII BUS signals to said first MII BUS device, said first MII BUS device converting said Layer 2 MII BUS signals and transmitting out Layer 1 signals, for PHY, or MAC packet data, for MAC;
    a clock coupled to supply a clock input of said first, second, and third MII BUS devices, all said first, second and third MII BUS devices transmitting at the same clock rate.

3. The MII BUS device splitter of claim 2 further comprised of a management packet path, INNER LOOP, of which carries Layer 2 MII BUS signals converted by said second MII BUS device from Layer 1 signals, for PHY, or MAC packet data, for MAC, to said third MII BUS device;
    said third MII BUS device converting said layer 2 MII BUS signals received on said management packet path, INNER LOOP, to Layer 1 signals, for PHY, or MAC packet data, for MAC.

4. The MII BUS device splitter of claim 3 where:
    said second MII BUS device connected to a first radio board, using the transmitting and receiving layer 1 signals, for PHY, or MAC packet data, for MAC;
    said third MII BUS device is connected to a second radio board, using the transmitting and receiving layer 1 signals, for PHY, or MAC packet data, for MAC.

5. The MII BUS device splitter of claim 4 where the management packet path, INNER LOOP, Layer 2 MII BUS signals by said second MII BUS device to said third MII BUS device are not connected, preventing said first MII BUS device Layer 1 connect devices, for PHY, or MAC packet data, for MAC, from communication with said first radio board or said second radio board.

6. The MII BUS device splitter of claim 2 where interfacing glue logic between different MII BUS variants of said first MII BUS device and said second MII BUS device, or said second MII BUS device and said third MII BUS device, or said third MII BUS device and said first MII BUS device;
    with or without use of said clock input for use with glue logic.

* * * * *